US011155480B2

(12) United States Patent
Moloney et al.

(10) Patent No.: US 11,155,480 B2
(45) Date of Patent: Oct. 26, 2021

(54) USE OF CATIONIC SUGAR-BASED COMPOUNDS AS CORROSION INHIBITORS IN A WATER SYSTEM

(71) Applicant: ECOLAB USA INC., Saint Paul, MN (US)

(72) Inventors: Jeremy Moloney, Saint Paul, MN (US); Ashish Dhawan, Saint Paul, MN (US); Carter M. Silvernail, Saint Paul, MN (US)

(73) Assignee: Ecolab USA Inc., Saint Paul, MN (US)

( * ) Notice: Subject to any disclaimer, the term of this patent is extended or adjusted under 35 U.S.C. 154(b) by 2 days.

(21) Appl. No.: 16/774,226

(22) Filed: Jan. 28, 2020

(65) Prior Publication Data

US 2020/0239338 A1    Jul. 30, 2020

Related U.S. Application Data

(60) Provisional application No. 62/798,245, filed on Jan. 29, 2019.

(51) Int. Cl.
*C02F 1/68* (2006.01)
*C23F 11/14* (2006.01)
*C23F 11/173* (2006.01)

(52) U.S. Cl.
CPC .............. *C02F 1/68* (2013.01); *C23F 11/141* (2013.01); *C23F 11/173* (2013.01); *C02F 2303/08* (2013.01)

(58) Field of Classification Search
USPC .............................. 210/651, 654, 653; 422/12
See application file for complete search history.

(56) References Cited

U.S. PATENT DOCUMENTS

| | | | | |
|---|---|---|---|---|
| 4,705,665 A | * | 11/1987 | Malik | C09K 8/74 134/3 |
| 5,330,674 A | * | 7/1994 | Urfer | C11D 3/48 510/384 |
| 5,614,616 A | | 3/1997 | Buysch et al. | |
| 5,738,795 A | | 4/1998 | Chen | |
| 5,773,595 A | * | 6/1998 | Weuthen | A61K 8/604 536/123.1 |

(Continued)

FOREIGN PATENT DOCUMENTS

| CN | 101972612 A | 2/2011 |
|---|---|---|
| CN | 104130335 A | 11/2014 |

(Continued)

OTHER PUBLICATIONS

International Searching Authority, in connection with PCT/US2020/015360 filed Jan. 28, 2020, "The International Search Report and the Written Opinion of the International Searching Authority, or the Declataion", 13 pages, dated Apr. 28, 2020.

(Continued)

*Primary Examiner* — Nina Bhat
(74) *Attorney, Agent, or Firm* — McKee, Voorhees & Sease, PLC

(57) ABSTRACT

Described herein are the methods of using a cationic alkyl polyglycoside in a corrosion control composition to reduce corrosion for metal surfaces in a water system. The described methods or compositions are found to be effective than those methods or compositions including commonly used corrosion inhibitors for water systems.

22 Claims, 1 Drawing Sheet

(56) References Cited

U.S. PATENT DOCUMENTS

| | | | |
|---|---|---|---|
| 6,004,466 A * | 12/1999 | Derian | C02F 1/444 134/10 |
| 6,054,054 A | 4/2000 | Robertson et al. | |
| 6,080,323 A * | 6/2000 | Yu | A01N 43/16 210/758 |
| 6,221,828 B1 * | 4/2001 | Matsuo | C11D 1/83 510/237 |
| 6,503,880 B1 | 1/2003 | Skold et al. | |
| 6,797,785 B1 | 9/2004 | Hund et al. | |
| 6,881,710 B1 | 4/2005 | O'Lenick, Jr. et al. | |
| 7,052,614 B2 * | 5/2006 | Barak | C02F 1/722 210/752 |
| 7,084,129 B1 * | 8/2006 | Smith | A61K 31/70 514/53 |
| 7,345,015 B1 * | 3/2008 | Kong | C11D 1/662 510/238 |
| 7,507,399 B1 * | 3/2009 | O'Lenick, Jr. | A61K 8/604 424/401 |
| 7,612,045 B2 * | 11/2009 | Eldridge | A61Q 11/00 514/31 |
| 8,324,264 B1 * | 12/2012 | Eldridge | C07D 413/08 514/406 |
| 8,933,055 B2 * | 1/2015 | Pedersen | A61P 31/12 514/54 |
| 10,850,999 B2 * | 12/2020 | DiMascio | B01J 19/305 |
| 10,945,431 B2 * | 3/2021 | Karandikar | C11D 3/30 |
| 2001/0044393 A1 | 11/2001 | Peterson, Jr. et al. | |
| 2002/0155978 A1 | 10/2002 | Man et al. | |
| 2003/0121532 A1 * | 7/2003 | Coughlin | B08B 9/057 134/7 |
| 2005/0215461 A1 | 9/2005 | Gluck et al. | |
| 2006/0008496 A1 | 1/2006 | Kulkarni et al. | |
| 2006/0191851 A1 * | 8/2006 | Mizuno | C02F 5/10 210/699 |
| 2007/0179079 A1 * | 8/2007 | Kilkenny | C11D 3/3796 510/499 |
| 2008/0039357 A1 * | 2/2008 | Gross | C11D 1/8255 510/471 |
| 2008/0152567 A1 * | 6/2008 | Killough | A22B 7/00 423/243.01 |
| 2008/0272342 A1 * | 11/2008 | Guzmann | C09K 5/10 252/392 |
| 2010/0029530 A1 | 2/2010 | Whiteley | |
| 2010/0305014 A1 | 12/2010 | Miralles et al. | |
| 2011/0112007 A1 | 5/2011 | Hodge et al. | |
| 2012/0046215 A1 * | 2/2012 | Hodge | C11D 1/008 510/470 |
| 2012/0053111 A1 | 3/2012 | Hodge et al. | |
| 2012/0258157 A1 * | 10/2012 | Koltzenburg | D06M 15/09 424/409 |
| 2013/0266669 A1 | 10/2013 | Jiang et al. | |
| 2014/0124454 A1 | 5/2014 | Nichols et al. | |
| 2014/0200168 A1 | 7/2014 | Misra et al. | |
| 2014/0224733 A1 | 8/2014 | Osness et al. | |
| 2015/0126417 A1 * | 5/2015 | Hatchman | C09K 8/584 507/219 |
| 2015/0272124 A1 | 10/2015 | Pedersen et al. | |
| 2015/0290100 A1 | 10/2015 | Eder et al. | |
| 2016/0030315 A1 | 2/2016 | Emiru et al. | |
| 2016/0262999 A1 | 9/2016 | Pedersen et al. | |
| 2018/0007895 A1 * | 1/2018 | Karandikar | C11D 3/33 |
| 2018/0066211 A1 | 3/2018 | Pickering et al. | |
| 2019/0223434 A1 * | 7/2019 | Balasubramanian | A01N 43/16 |

FOREIGN PATENT DOCUMENTS

| | | |
|---|---|---|
| CN | 104130351 B | 11/2014 |
| CN | 105076201 A | 11/2015 |
| CN | 106172434 A | 12/2016 |
| CN | 107440935 A | 12/2017 |
| CN | 108048249 A | 5/2018 |
| EP | 0296441 A2 | 12/1988 |
| JP | 2014009177 A | 1/2014 |
| WO | 2013087287 A1 | 6/2013 |
| WO | 2013113740 A2 | 8/2013 |
| WO | 2014079621 A1 | 5/2014 |
| WO | 2017030537 A1 | 2/2017 |
| WO | 2018112548 A1 | 6/2018 |
| WO | 2019046409 A1 | 3/2019 |

OTHER PUBLICATIONS

Brycki et al., "The biodegradation of monomeric and dimeric alkylammonium surfactants", Journal of Hazardous Materials, vol. 280, pp. 797-815, Aug. 6, 2014.

Gan et al., "Sugar-Based Ester Quaternary Ammonium Compounds and Their Surfactant Properties", Journal of Surfactants and Detergents, vol. 17, Issue 3, pp. 465-470, Jan. 18, 2014.

Negm et al., "Synthesis, Characterization and Biological Activity of Sugar-Based Gemini Cationic Amphiphiles", Journal of Surfactants and Detergents, vol. 11, Issue 3, pp. 215-221, Jun. 13, 2008.

Tan et al., "The use of quaternised chitosan-loaded PMMA to inhibit biofilm formation and downregulate the virulence-associated gene expression of antibiotic-resistant *Staphylococcus*", Biomaterials, vol. 33, Issue 2, pp. 365-377, Jan. 2012.

Zaky, Mohamad, "Biocidal Activities of Cationic Surface Active Starch and Its Transition Metal Complexes Against Different Bacterial Strains", Journal of Surfactants and Detergents, vol. 13, Issue 3, pp. 255-260, Jul. 2010.

Zhi et al., "Self-aggregation and antimicrobial activity of saccharide-cationic surfactants", Colloids and Surfaces A: Physicochemical and Engineering Aspects, vol. 456, pp. 231-237, Aug. 2014.

\* cited by examiner

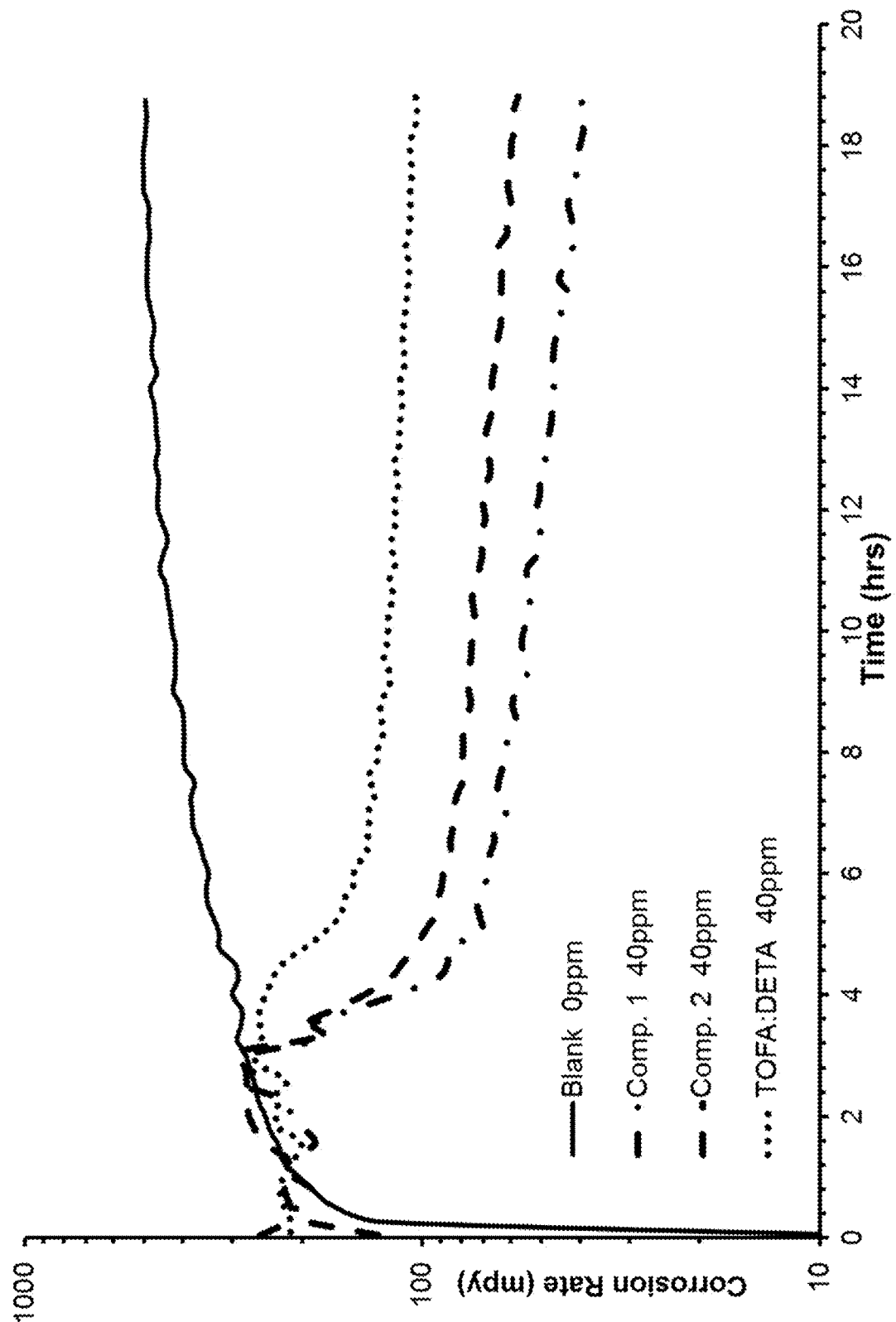

USE OF CATIONIC SUGAR-BASED COMPOUNDS AS CORROSION INHIBITORS IN A WATER SYSTEM

CROSS-REFERENCE TO RELATED APPLICATIONS

This application claims priority under 35 U.S.C. § 119 to provisional application Ser. No. 62/798,245, filed Jan. 29, 2019, herein incorporated by reference in its entirety.

FIELD OF THE INVENTION

The present disclosure relates generally to the field of corrosion control in a water system, using one or more cationic alkyl polyglycosides. In particular, the present disclosure relates to using a corrosion control composition comprising one or more cationic alkyl polyglycosides for corrosion control in a water system, especially in a water system for oil and gas operation. The methods and corrosion control compositions disclosed herein are effective to prevent corrosion in a water system and more environmentally friendly, since the cationic alkyl polyglycosides can be derived from compounds in natural resources and degraded to natural products.

BACKGROUND OF THE INVENTION

A water system, including an industrial water system in oil and gas operation, serves many different purposes. Any water system, including its equipment and water, is prone to microbial contamination and fouling. Metal surfaces in any water system are prone to corrosion, partly due to microbial contamination and fouling.

Corrosion inhibitors are often added into a water system to protect its metal surface infrastructure, such as carbon steel pipelines, from corrosion. Quaternary ammonium compounds have been used for many years as corrosion inhibitors and fouling control agents for a water system.

Quaternary ammonium compounds belong to an important subcategory of surfactants because they contain unique properties. A main distinction between quaternary ammonium compounds from other surfactants is their unique structures. Quaternary ammonium compounds consist mainly of two moieties, a hydrophobic group, e.g., long alkyl group, and a quaternary ammonium salt group. The unique positive charge of the ammonium plays a key role, e.g., electrostatic interactions, between the surfactant and surface or different components of biofilms.

However, the quaternary ammonium compounds used for such purpose are often bis quaternary species or species quaternized with benzyl chloride that are known to be very hazardous. In additional, governmental regulations exist to release any water containing single quaternary compounds into environment. Therefore, there is a continuing need for different or alternative quaternary ammonium compounds that are better and safer corrosion control agents.

Accordingly, it is an objective of the present disclosure to develop novel corrosion control agents having improved corrosion control properties.

It is a further objective of the disclosure to develop methods and corrosion control compositions to make corrosion control in a water system more efficient and effective.

These and other objects, advantages and features of the present disclosure will become apparent from the following specification taken in conjunction with the claims set forth herein.

BRIEF SUMMARY OF THE INVENTION

Disclosed herein are the methods and compositions for corrosion control for a metal surface in a water system. Specifically, the disclosed methods and compositions for corrosion control for a metal surface in a water system use one or more water soluble cationic alkyl polyglycoside compounds.

The exemplary cationic alkyl polyglycoside compounds disclosed herein show their effectiveness for controlling corrosion on a metal surface. In a related application, U.S. Patent Application No. 62/798,193, filed simultaneously herewith and titled "USE OF CATIONIC SUGAR-BASED COMPOUNDS FOR MICROBIAL FOULING CONTROL IN A WATER SYSTEM", these cationic alkyl polyglycoside compounds were also demonstrated to be effective for preventing bacteria or biofilm growth or as fouling control agent in a fouling control composition for water systems. Not only are these cationic alkyl polyglycosides preferred because they are derived from natural resources, e.g., polyglycosides and fatty alcohols, and degraded to natural products and are environmentally friendly, but also more effective because they function both as corrosion control agents and microbial/biofilm growth control agents.

In one aspect, provided herein is a corrosion control composition, wherein the composition comprises a cationic alkyl polyglycoside and one or more additional corrosion control composition agents, wherein the corrosion control composition reduces corrosion on a surface in the water system.

In another aspect, disclosed herein is a method of corrosion control on a surface in a water system, wherein the method comprises providing a corrosion control composition onto a surface in a water system or into a water system to generate a treated water system, wherein the corrosion control composition comprises a cationic alkyl polyglycoside and wherein the corrosion control composition reduces corrosion. In some embodiments, the corrosion control composition further comprises one or more additional corrosion control composition agents.

The corrosion control compositions and methods disclosed herein have a surprising advantage of not only preventing corrosion of metal surfaces in a water system but also preventing microbial/biofilm growth, leading to overall reduction in chemical uses, cost, and operation complexity for operating a water system. In some embodiments, the corrosion control composition or methods disclosed herein are free of other corrosion inhibitor and/or fouling control agent.

The forgoing summary is illustrative only and is not intended to be in any way limiting. In addition to the illustrative aspects, embodiments and features described above, further aspects, embodiments, and features of the present technology will become apparent to those skilled in the art from the following drawings and the detailed description, which shows and describes illustrative embodiments of the present technology. Accordingly, the figures and detailed description are also to be regarded as illustrative in nature and not in any way limiting.

BRIEF DESCRIPTION OF DRAWINGS

FIG. 1 shows the corrosion rate in mils per year (mpy) during the bubble test period (18 hour). For the blank sample, no 2-mercaptoethanol (2ME) was added.

Various embodiments of the present disclosure will be described in detail with reference to the drawings, wherein like reference numerals represent like parts throughout the several views. Reference to various embodiments does not limit the scope of the invention. Figures represented herein are not limitations to the various embodiments according to the disclosure and are presented for exemplary illustration of the invention.

DETAILED DESCRIPTION OF THE PREFERRED EMBODIMENT

In the following detailed description, reference may made to the accompanying drawings, schemes, and structures which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

Disclosed herein are methods and composition for corrosion control for a metal surface in a water system. More particularly, one or more cationic alkyl polyglycosides are used in corrosion control compositions or methods disclosed herein. These specific alkyl polyglycosides can be derived from polyglucoses.

The embodiments of this disclosure are not limited to any specific compositions and methods which can vary and are understood by skilled artisans. It is further to be understood that all terminology used herein is for describing particular embodiments only and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form.

Numeric ranges recited within the specification are inclusive of the numbers within the defined range. Throughout this disclosure, various aspects of this disclosure are presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range (e.g. 1 to 5 includes 1, 1.5, 2, 2.75, 3, 3.80, 4, and 5).

So that the present disclosure may be more readily understood, certain terms are first defined. Unless defined otherwise, all technical and scientific terms used herein have the same meaning as commonly understood by one of ordinary skill in the art to which embodiments of the disclosure pertain. Many methods and materials similar, modified, or equivalent to those described herein can be used in the practice of the embodiments of the present disclosure without undue experimentation, the preferred materials and methods are described herein. In describing and claiming the embodiments of the present invention, the following terminology will be used in accordance with the definitions set out below.

The term "about," as used herein, refers to variation in the numerical quantity that can occur, for example, through typical measuring and liquid handling procedures used for making concentrates or use solutions in the real world; through error in these procedures; through differences in the manufacture, source, or purity of the ingredients used to make the compositions or carry out the methods; and the like. The term "about" also encompasses amounts that differ due to novel equilibrium conditions for a composition resulting from a particular initial mixture. Whether or not modified by the term "about", the claims include equivalents to the quantities.

As used herein, "substituted" refers to an organic group as defined below (e.g., an alkyl group) in which one or more bonds to a hydrogen atom contained therein are replaced by a bond to non-hydrogen or non-carbon atoms. Substituted groups also include groups in which one or more bonds to carbon(s) or hydrogen(s) atom replaced by one or more bonds, including double or triple bonds, to a heteroatom. Thus, a substituted group is substituted with one or more substituents, unless otherwise specified. A substituted group can be substituted with 1, 2, 3, 4, 5, or 6 substituents.

Substituted ring groups include rings and ring systems in which a bond to a hydrogen atom is replaced with a bond to a carbon atom. Therefore, substituted cycloalkyl, aryl, heterocyclyl, and heteroaryl groups may also be substituted with substituted or unsubstituted alkyl, alkenyl, and alkynyl groups are defined herein.

As used herein, the term "alkyl" or "alkyl groups" refers to saturated hydrocarbons having one or more carbon atoms, including straight-chain alkyl groups (e.g., methyl, ethyl, propyl, butyl, pentyl, hexyl, heptyl, octyl, nonyl, decyl, etc.), cyclic alkyl groups (or "cycloalkyl" or "alicyclic" or "carbocyclic" groups) (e.g., cyclopropyl, cyclopentyl, cyclohexyl, cycloheptyl, cyclooctyl, etc.), branched-chain alkyl groups (e.g., isopropyl, tert-butyl, sec-butyl, isobutyl, etc.), and alkyl-substituted alkyl groups (e.g., alkyl-substituted cycloalkyl groups and cycloalkyl-substituted alkyl groups).

Unless otherwise specified, the term "alkyl" includes both "unsubstituted alkyls" and "substituted alkyls." As used herein, the term "substituted alkyls" refers to alkyl groups having substituents replacing one or more hydrogens on one or more carbons of the hydrocarbon backbone. Such substituents may include, for example, alkenyl, alkynyl, halogeno, hydroxyl, alkylcarbonyloxy, arylcarbonyloxy, alkoxycarbonyloxy, aryloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), imino, sulfhydryl, alkylthio, arylthio, thiocarboxylate, sulfates, alkylsulfinyl, sulfonates, sulfamoyl, sulfonamido, nitro, trifluoromethyl, cyano, azido, heterocyclic, alkylaryl, or aromatic (including heteroaromatic) groups.

In some embodiments, substituted alkyls can include a heterocyclic group. As used herein, the term "heterocyclic group" includes closed ring structures analogous to carbocyclic groups in which one or more of the carbon atoms in the ring is an element other than carbon, for example, nitrogen, sulfur or oxygen. Heterocyclic groups may be saturated or unsaturated. Exemplary heterocyclic groups include, but are not limited to, aziridine, ethylene oxide (epoxides, oxiranes), thiirane (episulfides), dioxirane, azetidine, oxetane, thietane, dioxetane, dithietane, dithiete, azolidine, pyrrolidine, pyrroline, oxolane, dihydrofuran, and furan.

Alkenyl groups or alkenes are straight chain, branched, or cyclic alkyl groups having two to about 30 carbon atoms, and further including at least one double bond. In some embodiments, an alkenyl group has from 2 to about 30 carbon atoms, or typically, from 2 to 10 carbon atoms. Alkenyl groups may be substituted or unsubstituted. For a double bond in an alkenyl group, the configuration for the double bond can be a trans or cis configuration. Alkenyl groups may be substituted similarly to alkyl groups.

Alkynyl groups are straight chain, branched, or cyclic alkyl groups having two to about 30 carbon atoms, and further including at least one triple bond. In some embodiments, an alkynyl group has from 2 to about 30 carbon atoms, or typically, from 2 to 10 carbon atoms. Alkynyl groups may be substituted or unsubstituted. Alkynyl groups may be substituted similarly to alkyl or alkenyl groups.

As used herein, the terms "alkylene", "cycloalkylene", "alkynylides", and "alkenylene", alone or as part of another substituent, refer to a divalent radical derived from an alkyl, cycloalkyl, or alkenyl group, respectively, as exemplified by —$CH_2CH_2CH_2$—. For alkylene, cycloalkylene, alkynylene, and alkenylene groups, no orientation of the linking group is implied.

The term "ester" as used herein refers to —$R^{30}COOR^{31}$ group. $R^{30}$ is absent, a substituted or unsubstituted alkylene, cycloalkylene, alkenylene, alkynylene, arylene, aralkylene, heterocyclylalkylene, or heterocyclylene group as defined herein. $R^{31}$ is a substituted or unsubstituted alkyl, cycloalkyl, alkenyl, alkynyl, aryl, aralkyl, heterocyclylalkyl, or heterocyclyl group as defined herein.

The term "amine" (or "amino") as used herein refers to —$R^{32}NR^{33}R^{34}$ groups. $R^{32}$ is absent, a substituted or unsubstituted alkylene, cycloalkylene, alkenylene, alkynylene, arylene, aralkylene, heterocyclylalkylene, or heterocyclylene group as defined herein. $R^{33}$ and $R^{34}$ are independently hydrogen, or a substituted or unsubstituted alkyl, cycloalkyl, alkenyl, alkynyl, aryl, aralkyl, heterocyclylalkyl, or heterocyclyl group as defined herein.

The term "amine" as used herein also refers to an independent compound. When an amine is a compound, it can be represented by a formula of $R^{32'}R^{33'}R^{34'}$ groups, wherein and $R^{34}$ are independently hydrogen, or a substituted or unsubstituted alkyl, cycloalkyl, alkenyl, alkynyl, aryl, aralkyl, heterocyclylalkyl, or heterocyclyl group as defined herein.

The term "alcohol" as used herein refers to —$R^{35}OH$ groups. $R^{35}$ is absent, a substituted or unsubstituted alkylene, cycloalkylene, alkenylene, alkynylene, arylene, aralkylene, heterocyclylalkylene, or heterocyclylene group as defined herein.

The term "carboxylic acid" as used herein refers to —$R^{36}COOH$ groups. $R^{36}$ is absent, a substituted or unsubstituted alkylene, cycloalkylene, alkenylene, alkynylene, arylene, aralkylene, heterocyclylalkylene, or heterocyclylene group as defined herein.

The term "ether" as used herein refers to —$R^{37}OR^{38}$ groups. $R^{37}$ is absent, a substituted or unsubstituted alkylene, cycloalkylene, alkenylene, alkynylene, arylene, aralkylene, heterocyclylalkylene, or heterocyclylene group as defined herein. $R^{38}$ is a substituted or unsubstituted alkyl, cycloalkyl, alkenyl, alkynyl, aryl, aralkyl, heterocyclylalkyl, or heterocyclyl group as defined herein.

The term "solvent" as used herein refers to any inorganic or organic solvent. Solvents are useful in the disclosed method or composition as reaction solvents or carrier solvents. Suitable solvents include, but are not limited to, oxygenated solvents such as lower alkanols, lower alkyl ethers, glycols, aryl glycol ethers and lower alkyl glycol ethers. Examples of other solvents include, but are not limited to, methanol, ethanol, propanol, isopropanol and butanol, isobutanol, ethylene glycol, diethylene glycol, triethylene glycol, propylene glycol, dipropylene glycol, glycol ethers, mixed ethylene-propylene glycol ethers, ethylene glycol phenyl ether, and propylene glycol phenyl ether. Water is a solvent too. The solvent used herein can be of a single solvent or a mixture of many different solvents.

Glycol ethers include, but are not limited to, diethylene glycol n-butyl ether, diethylene glycol n-propyl ether, diethylene glycol ethyl ether, diethylene glycol methyl ether, diethylene glycol t-butyl ether, dipropylene glycol n-butyl ether, dipropylene glycol methyl ether, dipropylene glycol ethyl ether, dipropylene glycol propyl ether, dipropylene glycol tert-butyl ether, ethylene glycol butyl ether, ethylene glycol propyl ether, ethylene glycol ethyl ether, ethylene glycol methyl ether, ethylene glycol methyl ether acetate, propylene glycol n-butyl ether, propylene glycol ethyl ether, propylene glycol methyl ether, propylene glycol n-propyl ether, tripropylene glycol methyl ether and tripropylene glycol n-butyl ether, ethylene glycol phenyl ether, propylene glycol phenyl ether, and the like, or mixtures thereof.

Cationic Alkyl Polyglycosides

The corrosion control composition disclosed herein comprises a cationic alkyl polyglycoside. Alkyl polyglycosides are characterized by one or more monosaccharide units and at least one hydrophobic alkyl group to one of the hydroxyl groups of the saccharide units. These molecules differ in the saccharide unit, the degree of polymerization (DP) of the saccharide units, the number of alkyl groups, the alkyl chain length, both linear and mono-branched, etc.

When polyglycosides are derived from a glucose-based polymer, they are known as alkyl polyglucosides (APG). Starch is a polymeric carbohydrate consisting of many glucose units joined by glycosidic bonds and has a generic structure of

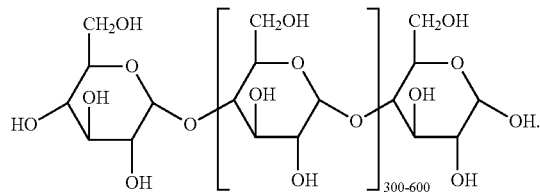

An alkyl polyglucoside, as used herein in this disclosure, is a molecule having one to ten glucose units backbone and at least one alkyl group attached one of the OH groups and has a generic structure of

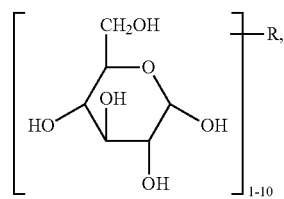

wherein R is an alkyl group and can be attached to any or all of the OH group in the molecule. A cationic alkyl polyglucoside, as used herein in this disclosure, is an alkyl polyglucoside having at least one cationic group in its alkyl group(s).

Within an alkyl polyglucoside or cationic alkyl polyglucoside, the glucose units can be joined together by glycosidic bonds as in starch, by another kind of linkage, through a linker, or a combination thereof. For example, a cationic alkyl glucoside having 2 glucose units has a structure of

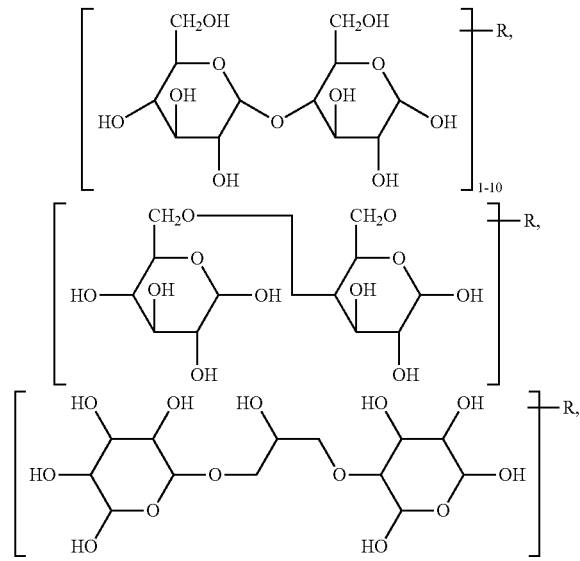

or other linkage with or without a linker between two OH groups in different glucose units. For a cationic alkyl glycoside with three or more glucose units, the linkage between two adjacent glucose units can be the same or different.

A class of alkyl polyglycosides has been widely used as nonionic surfactants in a variety of cosmetic, household, and industrial applications. Alkyl polyglycoside surfactants are usually characterized by one or more saccharide units, which are hydrophilic, in one end and a hydrophobic alkyl group in another end. They are usually derived from polysaccharides from natural resources and fatty alcohols in the presence of acid catalysts at elevated temperatures. The raw materials are typically starch and fat. The final products can be a complex mixture of compounds with different sugar moieties comprising one or more hydrophilic alkyl groups from the fatty alcohol.

As used in this disclosure, an alkyl polyglycoside or alkyl polyglucoside can comprise one or more alkyl groups and the alkyl groups can be different.

In some embodiments, the cationic alkyl polyglucoside can have a generic structure of

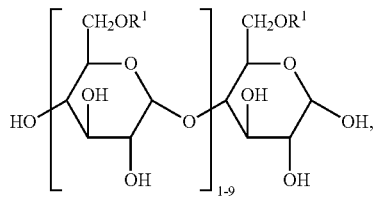

wherein $R^1$ is H or a $C_1$-$C_{30}$ alkyl group and at least one of $R^1$s in the molecule is a $C_1$-$C_{30}$ alkyl group containing a cationic group. In some other embodiments, the cationic alkyl polyglucoside can have a generic structure of

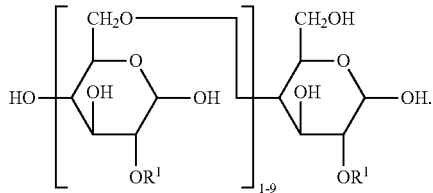

In yet some other embodiments, the cationic alkyl polyglucoside can have a generic structure of

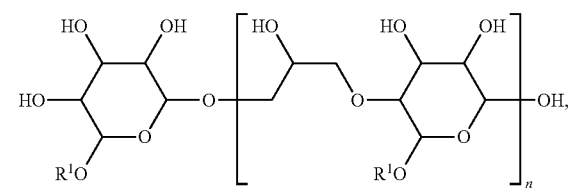

wherein n is from about 1-9 and IV is H or an $C_1$-$C_{30}$ alkyl group and at least one of IV is an alkyl group containing a cationic group.

A cationic alkyl polyglucoside, as referred in this disclosure, is an alkyl polyglucoside that are described above and have one or more cationic groups. In addition, in some embodiments, a cationic alkyl polyglucoside has a generic structure of

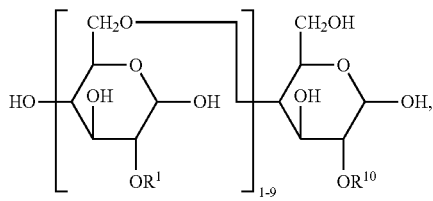

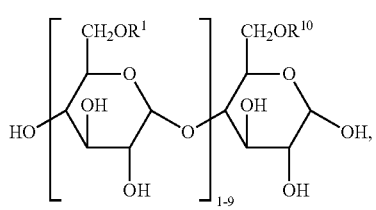

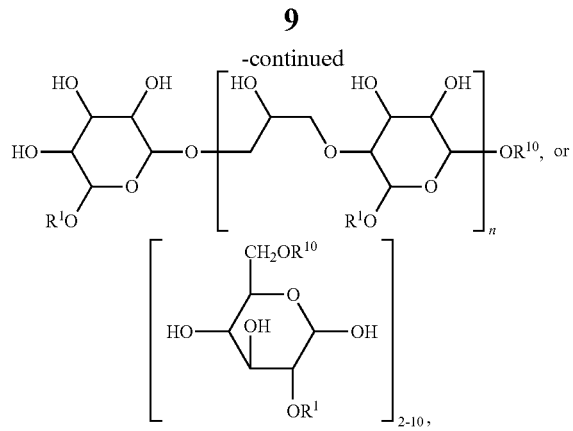

wherein n is 1-9; $R^1$ is H or an $C_1$-$C_{30}$ alkyl group; $R^{10}$ is a $R^{10'}$—$N^+(CH_3)_2R^2$; $R^{10'}$ is a $C_2$-$C_{10}$ alkyl; and $R^2$ is a —$(CH_2)_mCH_3$; and m is 0-21. In some other embodiments, the cationic alkyl polyglucoside has one of the above structures, wherein n is 1-9; $R^{10'}$ is H or an $C_1$-$C_{30}$ alkyl group; $R^1$ is a $R^{10-}$—$N^+(CH_3)_2R^2$; $R^{10'}$ is a $C_2$-$C_{10}$ alkyl; and $R^2$ is a —$(CH_2)_mCH_3$; and m is 0-21.

A cationic alkyl polyglucoside can be, but not limited to, a quaternized polyglucoside, polyquaternized polyglucoside, quaternized alkyl polyglucoside, polyquaternized alkyl polyglucoside, and the like. In some embodiments, the cationic alkyl polyglucoside comprises a single cationic alkyl group having a quaternary ammonium.

In some other embodiments, the cationic alkyl polyglucoside comprises two or more alkyl groups having a quaternary ammonium. In some other embodiments, the cationic alkyl polyglucoside comprises one alkyl group having a quaternary ammonium and one or more nonionic alkyl groups. In yet some other embodiments, the cationic alkyl polyglucoside comprises two or more alkyl groups having a quaternary ammonium and one or more nonionic alkyl groups.

As an example, the cationic alkyl polyglucoside can have a structure of

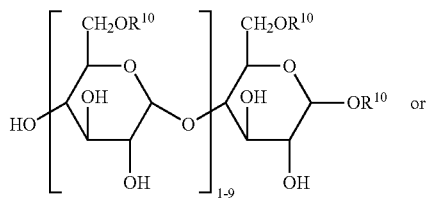 or

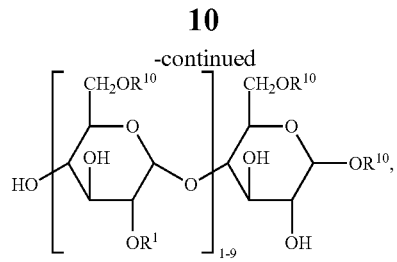

wherein $R^1$ is H or an $C_{10}$-$C_{18}$ alkyl group; $R^{10}$ is a —$CH_2CH(OH)CH_2$—$N^+(CH_3)_2R^2$; and $R^2$ is $C_8$-$C_{18}$ alkyl group. The cationic alkyl polyglucoside can also be

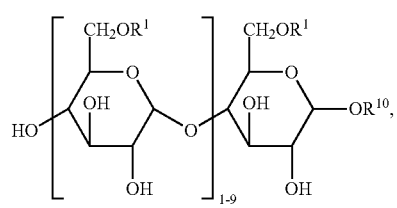

wherein $R^1$ is H or an $C_{10}$-$C_{18}$ alkyl group; $R^{10}$ is a —$CH_2CH(OH)CH_2$—$N^+(CH_3)_2R^2$; and $R^2$ is $C_8$-$C_{18}$ alkyl group. The cationic alkyl polyglucoside can also be

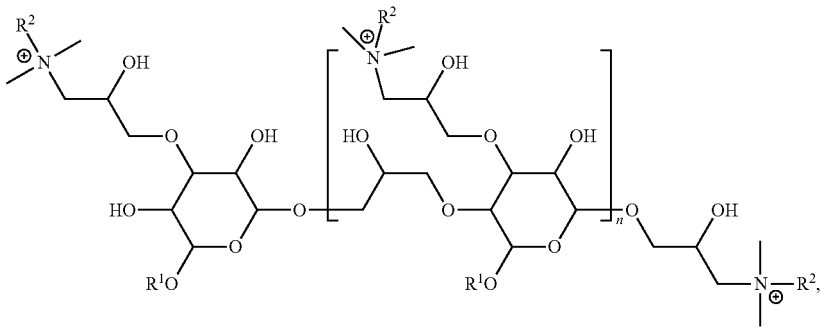

wherein $R^1$ is H or an $C_{10}$-$C_{18}$ alkyl group; $R^2$ is $C_8$-$C_{18}$ alkyl group, and n is 0-10. In some embodiments, the cationic alkyl polyglucoside can also be

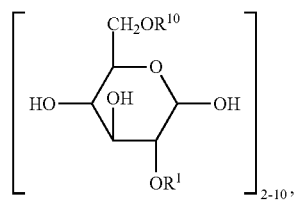

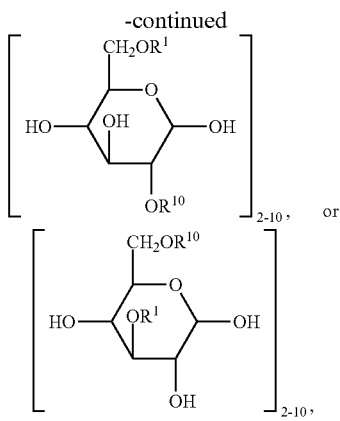

wherein $R^1$ is H or an $C_{10}$-$C_{18}$ alkyl group; $R^{10}$ is a —$(CH_2)_4$—$N^+(CH_3)_2R^2$; and $R^2$ is $C_8$-$C_{18}$ alkyl group.

Examples of commercially suitable cationic alkyl polyglucosides useful in the corrosion control compositions disclosed herein can include, but is not limited to, Poly Suga®Quat series of quaternary functionalized alkyl polyglucosides, available from Colonial Chemical, Inc., located in South Pittsburgh, Tenn.

Further examples of a suitable quaternary functionalized alkyl polyglucoside include, but are not limited to, the antimicrobial and antifungal quaternary functionalized alkyl polyglucosides described in U.S. Pat. Nos. 7,084,129 and 7,507,399 the disclosures of which are hereby incorporated by reference. Examples of commercially suitable quaternary functionalized alkyl polyglucosides useful in cleansing compositions of the present disclosure can include, but is not limited to, Suga®Quat™ 1212 (primarily $C_{12}$ quaternary functionalized alkyl polyglucoside), Suga®Quat L 1210 (primarily $C_{12}$ quaternary functionalized alkyl polyglucoside), and Suga®Quat S 1218 (primarily $C_{12}$ quaternary functionalized alkyl polyglucoside) available from Colonial Chemical, Inc., located in South Pittsburgh, Tenn.

Additional Corrosion Control Composition Agent in a Corrosion Control Composition In addition to the alkyl polyglycoside, a corrosion control composition in the present disclosure includes one or more additional corrosion control composition agents.

The additional corrosion control composition agent in the disclosed corrosion control compositions can include, but is not limited to, an acid, peroxycarboxylic acid, peroxycarboxylic acid composition, carrier, dispersant, biocide, additional corrosion inhibitor, fouling control agent, antioxidant, polymer degradation prevention agent, permeability modifier, foaming agent, antifoaming agent, fracturing proppant, scavenger for $H_2S$, $CO_2$, and/or $O_2$, gelling agent, lubricant, friction reducing agent, salt, or mixtures thereof.

The additional corrosion control composition agent in the disclosed corrosion control compositions can also include, but not be limited to, an organic sulfur compound, asphaltene inhibitor, paraffin inhibitor, scale inhibitor, water clarifier, emulsion breaker, reverse emulsion breaker, gas hydrate inhibitor, a pH modifier, a surfactant, or a combination thereof.

Furthermore, the additional corrosion control composition agent can be a sequestrant, solubilizer, lubricant, buffer, cleaning agent, rinse aid, preservative, binder, thickener or other viscosity modifier, processing aid, carrier, water-conditioning agent, or foam generator, threshold agent or system, aesthetic enhancing agent (e.g., dye, odorant, perfume), or other additive suitable for formulation with a corrosion control composition, or mixtures thereof.

The additional corrosion control composition agent in a corrosion control composition disclosed herein will vary according to the specific corrosion control composition being manufactured and its intend use as one skilled in the art will appreciate.

Alternatively, the corrosion control composition does not contain or is free of one or more of the additional corrosion control composition agents.

When one or more additional corrosion control composition agents are used in the corrosion control compositions disclosed herein, they can be formulated together with the cationic alkyl glycosides as described here in the same corrosion control composition. Alternatively, some or all the additional corrosion control composition agents can be formulated into one or more different formulations and be supplied to the water system. In other words, the additional corrosion control composition agents can be provided into a water system independently, simultaneously, or sequentially.

Acids

Generally, acids, as used in this disclosure, include both organic and inorganic acids. Organic acids include, but not limited to, hydroxyacetic (glycolic) acid, formic acid, acetic acid, propionic acid, butyric acid, valeric acid, caproic acid, gluconic acid, itaconic acid, trichloroacetic acid, urea hydrochloride, and benzoic acid. Organic acids also include dicarboxylic acids such as oxalic acid, malonic acid, succinic acid, glutaric acid, maleic acid, fumaric acid, adipic acid, and terephthalic acid. Combinations of these organic acids can also be used. Inorganic acids include, but are not limited to, mineral acids, such as phosphoric acid, sulfuric acid, sulfamic acid, methylsulfamic acid, hydrochloric acid, hydrobromic acid, hydrofluoric acid, and nitric acid. Inorganic acids can be used alone, in combination with other inorganic acid(s), or in combination with one or more organic acid. Acid generators can be used to form a suitable acid, including for example generators such as potassium fluoride, sodium fluoride, lithium fluoride, ammonium fluoride, ammonium bifluoride, sodium silicofluoride, etc.

Examples of particularly suitable acids in this the methods or compositions disclosed herein include inorganic and organic acids. Exemplary inorganic acids include phosphoric, phosphonic, sulfuric, sulfamic, methylsulfamic, hydrochloric, hydrobromic, hydrofluoric, and nitric. Exemplary organic acids include hydroxyacetic (glycolic), citric, lactic, formic, acetic, propionic, butyric, valeric, caproic, gluconic, itaconic, trichloroacetic, urea hydrochloride, and benzoic. Organic dicarboxylic acids can also be used such as oxalic, maleic, fumaric, adipic, and terephthalic acid.

Percarboxylic Acids and Peroxycarboxylic Acid Compositions

A peroxycarboxylic acid (e.g. peracid) or peroxycarboxylic acid composition can be included in the articles, products, or compositions disclosed herein. As used herein, the term "peracid" may also be referred to as a "percarboxylic acid," "peroxycarboxylic acid" or "peroxyacid." Sulfoperoxycarboxylic acids, sulfonated peracids and sulfonated peroxycarboxylic acids are also included within the terms "peroxycarboxylic acid" and "peracid" as used herein. As one of skill in the art appreciates, a peracid refers to an acid having the hydrogen of the hydroxyl group in carboxylic acid replaced by a hydroxy group. Oxidizing peracids may also be referred to herein as peroxycarboxylic acids.

A peracid includes any compound of the formula R—$(COOOH)_n$ in which R can be hydrogen, alkyl, alkenyl, alkyne, acylic, alicyclic group, aryl, heteroaryl, or heterocyclic group, and n is 1, 2, or 3, and named by prefixing the parent acid with peroxy. Preferably R includes hydrogen, alkyl, or alkenyl. The terms "alkyl," "alkenyl," "alkyne," "acylic," "alicyclic group," "aryl," "heteroaryl," and "heterocyclic group" are as defined herein.

A peroxycarboxylic acid composition, as used herein, refers to any composition that comprises one or more peracids, their corresponding acids, and hydrogen peroxide or other oxidizing agents. A peroxycarboxylic acid composition can also include a stabilizer, fluorescent active tracer or compound, or other ingredients, as one skilled in the other would know.

As used herein, the terms "mixed" or "mixture" when used relating to "percarboxylic acid composition," "percarboxylic acids," "peroxycarboxylic acid composition" or "peroxycarboxylic acids" refer to a composition or mixture including more than one percarboxylic acid or peroxycarboxylic acid. Peracids such as peroxyacetic acid and peroxyoctanoic acid may also be used. Any combination of these acids may also be used.

In some embodiments, however, the articles, products, or compositions disclosed herein are free of a peroxycarboxylic acid or peroxycarboxylic acid composition.

Biocide and Carrier

In some embodiments, the corrosion control compositions disclosed herein further include a biocide. In some other embodiments, the disclosed corrosion control compositions herein further include a carrier. In some other embodiments, the disclosed corrosion control compositions herein further include a biocide and carrier. In some embodiments, the disclosed methods or corrosion control compositions herein may consist of one or more cationic alkyl polyglycosides and carrier. In some embodiments, the corrosion control compositions disclosed herein consist of one or more cationic alkyl polyglycosides, a carrier, and biocide.

Biocides suitable for use may be oxidizing or non-oxidizing biocides. Oxidizing biocides include, but are not limited to, bleach, chlorine, bromine, chlorine dioxide, and materials capable of releasing chlorine and bromine. Non-oxidizing biocides include, but are not limited to, glutaraldehyde, isothiazolin, 2,2-dibromo-3-nitrilopropionamide, 2-bromo-2-nitropropane-1,3 diol, 1-bromo-1-(bromomethyl)-1,3-propanedicarbonitrile, tetrachloroisophthalonitrile, alkyldimethylbenzylammonium chloride, dimethyl dialkyl ammonium chloride, didecyl dimethyl ammonium chloride, poly(oxyethylene(dimethyliminio)ethylene(dimethyliminio)ethylene dichloride, methylene bisthiocyanate, 2-decylthioethanamine, tetrakishydroxymethyl phosphonium sulfate, dithiocarbamate, cyanodithioimidocarbonate, 2-methyl-5-nitroimidazole-1-ethanol, 2-(2-bromo-2-nitroethenyl)furan, beta-bromo-beta-nitrostyrene, beta-nitrostyrene, beta-nitrovinyl furan, 2-bromo-2-bromomethyl glutaronitrile, bis(trichloromethyl) sulfone, S-(2-hydroxypropyl)thiomethanesulfonate, tetrahydro-3,5-dimethyl-2H-1,3,5-hydrazine-2-thione, 2-(thiocyanomethylthio)benzothiazole, 2-bromo-4'-hydroxyacetophenone, 1,4-bis(bromoacetoxy)-2-butene, bis(tributyltin)oxide, 2-(tert-butylamino)-4-chloro-6-(ethylamino)-s-triazine, dodecylguanidine acetate, dodecylguanidine hydrochloride, coco alkyldimethylamine oxide, n-coco alkyltrimethylenediamine, tetra-alkyl phosphonium chloride, 7-oxabicyclo[2.2.1]heptane-2,3-dicarboxylic acid, 4,5-dichloro-2-n-octyl-4-isothiazoline-3-one, 5-chloro-2-methyl-4-isothiazolin-3-one and 2-methyl-4-isothiazolin-3-one.

Suitable non-oxidizing biocides also include, for example, aldehydes (e.g., formaldehyde, glutaraldehyde, and acrolein), amine-type compounds (e.g., quaternary amine compounds and cocodiamine), halogenated compounds (e.g., 2-bromo-2-nitropropane-3-diol (Bronopol) and 2-2-dibromo-3-nitrilopropionamide (DBNPA)), sulfur compounds (e.g., isothiazolone, carbamates, and metronidazole), and quaternary phosphonium salts (e.g., tetrakis(hydroxymethyl)-phosphonium sulfate (THPS)).

Suitable oxidizing biocides include, for example, sodium hypochlorite, trichloroisocyanuric acids, dichloroisocyanuric acid, calcium hypochlorite, lithium hypochlorite, chlorinated hydantoins, stabilized sodium hypobromite, activated sodium bromide, brominated hydantoins, chlorine dioxide, ozone, peroxycarboxylic acid, peroxycarboxylic acid composition, and peroxides.

The composition can comprise from about 0.1 to about 10 wt-%, from about 0.5 to about 5 wt-%, or from about 0.5 to about 4 wt-% of a biocide, based on total weight of the composition.

A carrier in the disclosed corrosion control composition can be water, an organic solvent, or a combination of water and an organic solvent. The organic solvent can be an alcohol, a hydrocarbon, a ketone, an ether, an alkylene glycol, a glycol ether, an amide, a nitrile, a sulfoxide, an ester, or a combination thereof. Examples of suitable organic solvents include, but are not limited to, methanol, ethanol, propanol, isopropanol, butanol, 2-ethylhexanol, hexanol, octanol, decanol, 2-butoxyethanol, methylene glycol, ethylene glycol, 1,2-propylene glycol, 1,3-propylene glycol, diethyleneglycol monomethyl ether, diethylene glycol monoethyl ether, ethylene glycol monobutyl ether, ethylene glycol dibutyl ether, pentane, hexane, cyclohexane, methylcyclohexane, heptane, decane, dodecane, diesel, toluene, xylene, heavy aromatic naphtha, cyclohexanone, diisobutylketone, diethyl ether, propylene carbonate, N-methylpyrrolidinone, N,N-dimethylformamide, or a combination thereof.

The corrosion control composition can comprise from about 1 wt-% to about 80 wt-%, from about 1 wt-% to about 70 wt-%, from about 1 wt-% to about 60 wt-%, from about 1 wt-% to about 50 wt-%, from about 1 wt-% to about 40 wt-%, from about 1 wt-% to about 30 wt-%, from about 1 wt-% to about 20 wt-%, from about 1 wt-% to about 10 wt-%, from about 5 wt-% to about 10 wt-%, from about 5 wt-% to about 20 wt-%, from about 5 wt-% to about 30 wt-%, from about 5 wt-% to about 40 wt-%, from about 5 wt-% to about 50 wt-%, from about 10 wt-% to about 20 wt-%, from about 10 wt-% to about 30 wt-%, from about 10 wt-% to about 40 wt-%, from about 10 wt-% to about 50 wt-%, about 10 wt-%, about 20 wt-%, about 30 wt-%, about 40-%, about 50 wt-%, about 60 wt-%, about 70 wt-%, about 90 wt-%, or any value there between of the one or more carrier, based on total weight of the composition.

Additional Corrosion Inhibitor

In some embodiments, the corrosion control compositions disclosed herein can further include an additional corrosion inhibitor. In some other embodiments, the disclosed corrosion control compositions herein can further include an additional corrosion inhibitor and carrier. In some other embodiments, the disclosed corrosion control compositions herein further include an additional corrosion inhibitor, biocide, and carrier. In some embodiments, the disclosed corrosion control compositions herein may consist of one or more cationic alkyl polyglycosides, one or more additional corrosion inhibitors and carrier. In some embodiments, the corrosion control compositions disclosed herein consist of one or more cationic alkyl polyglycosides, a carrier, additional corrosion inhibitor, and a biocide.

The corrosion control composition can comprise from about 0.1 wt-% to about 20 wt-%, from about 0.1 wt-% to about 10 wt-%, or from 0.1 to about 5 wt-% of the one or more additional corrosion inhibitors, based on total weight of the composition. A composition disclosed herein can comprise from 0 to 10 percent by weight of the one or more additional corrosion inhibitors, based on total weight of the composition. The composition can comprise about 1.0 wt-%, about 1.5 wt-%, about 2.0 wt-%, about 2.5 wt-%, about 3.0 wt-%, about 3.5 wt-%, about 4.0 wt-%, about 4.5 wt-%, about 5.0 wt-%, about 5.5 wt-%, about 6.0 wt-%, about 6.5 wt-%, about 7.0 wt-%, about 7.5 wt-%, about 8.0 wt-%, about 8.5 wt-%, about 9.0 wt-%, about 9.5 wt-%, about 10.0 wt-%, about 10.5 wt-%, about 11.0 wt-%, about 11.5 wt-%, about 12.0 wt-%, about 12.5 wt-%, about 13.0 wt-%, about 13.5 wt-%, about 14.0 wt-%, about 14.5 wt-%, or about 15.0 wt-% of the one or more additional corrosion inhibitors, based on total weight of the composition. Each water system can have its own requirements for using an additional corrosion inhibitor, and the weight percent of one or more additional corrosion inhibitors in the composition can vary with the water system in which it is used.

An additional corrosion inhibitor may still be needed to further reduce corrosion of metals in the water system. Additional corrosion inhibitors for multi-metal protection are typically triazoles, such as, but not limited to, benzotriazole, halogenated triazoles, and nitro-substituted azoles.

The one or more additional corrosion inhibitors can be an imidazoline compound, a quaternary ammonium compound, a pyridinium compound, or a combination thereof.

The one or more additional corrosion inhibitors can be an imidazoline. The imidazoline can be, for example, imidazoline derived from a diamine, such as ethylene diamine (EDA), diethylene triamine (DETA), triethylene tetraamine (TETA) etc. and a long chain fatty acid such as tall oil fatty acid (TOFA). The imidazoline can be an imidazoline of Formula (1A) or an imidazoline derivative. Representative imidazoline derivatives include an imidazolinium compound of Formula (2A) or a bis-quaternized compound of Formula (3A).

The one or more additional corrosion inhibitors can include an imidazoline of Formula (1A):

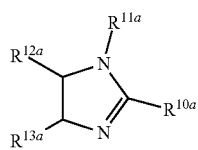

(1A)

wherein $R^{10a}$ is a $C_1$-$C_{20}$ alkyl or a $C_1$-$C_{20}$ alkoxyalkyl group; $R^{11a}$ is hydrogen, $C_1$-$C_6$ alkyl, $C_1$-$C_6$ hydroxyalkyl, or $C_1$-$C_6$ arylalkyl; and $R^{12a}$ and $R^{13a}$ are independently hydrogen or a $C_1$-$C_6$ alkyl group. Preferably, the imidazoline includes an $R^{10a}$ which is the alkyl mixture typical in tall oil fatty acid (TOFA), and $R^{11a}$, $R^{12a}$ and $R^{13a}$ are each hydrogen.

The one or more additional corrosion inhibitors can be an imidazolinium compound of Formula (2A):

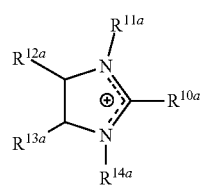

(2A)

wherein $R^{10a}$ is a $C_1$-$C_{20}$ alkyl or a $C_1$-$C_{20}$ alkoxyalkyl group; $R^{11a}$ and $R^{14a}$ are independently hydrogen, $C_1$-$C_6$ alkyl, $C_1$-$C_6$ hydroxyalkyl, or $C_1$-$C_6$ arylalkyl; $R^{12a}$ and $R^{13a}$ are independently hydrogen or a $C_1$-$C_6$ alkyl group; and $X^-$ is a halide (such as chloride, bromide, or iodide), carbonate, sulfonate, phosphate, or the anion of an organic carboxylic acid (such as acetate). Preferably, the imidazolinium compound includes 1-benzyl-1-(2-hydroxyethyl)-2-tall-oil-2-imidazolinium chloride.

The one or more additional corrosion inhibitors can be a bis-quaternized compound having the formula (3A):

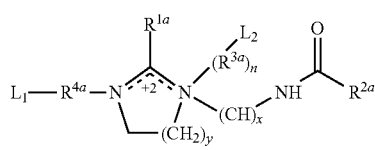

(3A)

wherein $R^{1a}$ and $R^{2a}$ are each independently unsubstituted branched, chain or ring alkyl or alkenyl having from 1 to about 29 carbon atoms; partially or fully oxygenized, sulfurized, and/or phosphorylized branched, chain, or ring alkyl or alkenyl having from 1 to about 29 carbon atoms; or a combination thereof; $R^{1a}$ and $R^{4a}$ are each independently unsubstituted branched, chain or ring alkylene or alkenylene having from 1 to about 29 carbon atoms; partially or fully oxygenized, sulfurized, and/or phosphorylized branched, chain, or ring alkylene or alkenylene having from 1 to about 29 carbon atoms; or a combination thereof; $L_1$ and $L_2$ are each independently absent, H, —COOH, —SO$_3$H, —PO$_3$H, —COOR$^{5a}$, —CONH$_2$, —CONHR$^{5a}$, or —CON(R$^{5a}$)$_2$; $R^{5a}$ is each independently a branched or unbranched alkyl, aryl, alkylaryl, alkylheteroaryl, cycloalkyl, or heteroaryl having from 1 to about 10 carbon atoms; n is 0 or 1, and when n is 0, $L_2$ is absent or H; x is from 1 to about 10; and y is from 1 to about 5. Preferably, $R^{1a}$ and $R^{2a}$ are each independently $C_6$-$C_{22}$ alkyl, $C_8$-$C_{20}$ alkyl, $C_{12}$-$C_{18}$ alkyl, $C_{16}$-$C_{18}$ alkyl, or a combination thereof; $R^{1a}$ and $R^{4a}$ are $C_1$-$C_{10}$ alkylene, $C_2$-$C_8$ alkylene, $C_2$-$C_6$ alkylene, or $C_2$-$C_3$ alkylene; n is 0 or 1; x is 2; y is 1; $R_3$ and $R_4$ are —C$_2$H$_2$—; $L_1$ is —COOH, —SO$_3$H, or —PO$_3$H; and $L_2$ is absent, H, —COOH, —SO$_3$H, or —PO$_3$H. For example, $R^{1a}$ and $R^{2a}$ can be derived from a mixture of tall oil fatty acids and are predominantly a mixture of $C_{17}H_{33}$ and $C_{17}H_{31}$ or can be $C_{16}$-$C_{18}$ alkyl; $R^{1a}$ and $R^{4a}$ can be $C_2$-$C_3$ alkylene such as —C$_2$H$_2$—; n is 1 and $L_2$ is —COOH or n is 0 and $L_2$ is absent or H; x is 2; y is 1; $R^{1a}$ and $R^{4a}$ are —C$_2$H$_2$—; and $L_1$ is —COOH.

It should be appreciated that the number of carbon atoms specified for each group of formula (3A) refers to the main chain of carbon atoms and does not include carbon atoms that may be contributed by substituents.

The one or more additional corrosion inhibitors can be a bis-quaternized imidazoline compound having the formula (3A) wherein $R^{1a}$ and $R^{2a}$ are each independently $C_6$-$C_{22}$ alkyl, $C_8$-$C_{20}$ alkyl, $C_{12}$-$C_{18}$ alkyl, or $C_{16}$-$C_{18}$ alkyl or a combination thereof; $R^{4a}$ is $C_1$-$C_{10}$ alkylene, $C_2$-$C_8$ alkylene, $C_2$-$C_6$ alkylene, or $C_2$-$C_3$ alkylene; x is 2; y is 1; n is 0; $L_1$ is —COOH, —$SO_3H$, or —$PO_3H$; and $L_2$ is absent or H. Preferably, a bis-quaternized compound has the formula (3A) wherein $R^{1a}$ and $R^{2a}$ are each independently $C_{16}$-$C_{18}$ alkyl; $R^{4a}$ is —$C_2H_2$—; x is 2; y is 1; n is 0; $L_1$ is —COOH, —$SO_3H$, or —$PO_3H$ and $L_2$ is absent or H.

The one or more additional corrosion inhibitors can be a quaternary ammonium compound of Formula (4A):

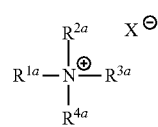

(4A)

wherein $R^{1a}$, $R^{2a}$, and $R^{1a}$ are independently $C_1$ to $C_{20}$ alkyl, $R^{4a}$ is methyl or benzyl, and $X^-$ is a halide or methosulfate.

Suitable alkyl, hydroxyalkyl, alkylaryl, arylalkyl or aryl amine quaternary salts include those alkylaryl, arylalkyl and aryl amine quaternary salts of the formula [N+$R^{5a}R^{6a}R^{7a}R^{8a}$][$X^-$] wherein $R^{5a}$, $R^{6a}$, $R^{7a}$, and $R^{8a}$ contain one to 18 carbon atoms, and X is Cl, Br or I. For the quaternary salts, $R^{5a}$, $R^{6a}$, $R^{7a}$, and $R^{8a}$ can each be independently alkyl (e.g., $C_1$-$C_{18}$ alkyl), hydroxyalkyl (e.g., $C_1$-$C_{18}$ hydroxyalkyl), and arylalkyl (e.g., benzyl). The mono or polycyclic aromatic amine salt with an alkyl or alkylaryl halide include salts of the formula [N+$R^{5a}R^{6a}R^{7a}R^{8a}$][$X^-$] wherein $R^{5a}$, $R^{6a}$, $R^{7a}$, and $R^{8a}$ contain one to 18 carbon atoms and at least one aryl group, and X is Cl, Br or I.

Suitable quaternary ammonium salts include, but are not limited to, a tetramethyl ammonium salt, a tetraethyl ammonium salt, a tetrapropyl ammonium salt, a tetrabutyl ammonium salt, a tetrahexyl ammonium salt, a tetraoctyl ammonium salt, a benzyltrimethyl ammonium salt, a benzyltriethyl ammonium salt, a phenyltrimethyl ammonium salt, a phenyltriethyl ammonium salt, a cetyl benzyldimethyl ammonium salt, a hexadecyl trimethyl ammonium salt, a dimethyl alkyl benzyl quaternary ammonium salt, a monomethyl dialkyl benzyl quaternary ammonium salt, or a trialkyl benzyl quaternary ammonium salt, wherein the alkyl group has about 6 to about 24 carbon atoms, about 10 and about 18 carbon atoms, or about 12 to about 16 carbon atoms. The quaternary ammonium salt can be a benzyl trialkyl quaternary ammonium salt, a benzyl triethanolamine quaternary ammonium salt, or a benzyl dimethylaminoethanolamine quaternary ammonium salt.

The one or more additional corrosion inhibitors can be a pyridinium salt such as those represented by Formula (5A):

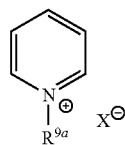

(5A)

wherein $R^{9a}$ is an alkyl group, an aryl group, or an arylalkyl group, wherein said alkyl groups have from 1 to about 18 carbon atoms and $X^-$ is a halide such as chloride, bromide, or iodide. Among these compounds are alkyl pyridinium salts and alkyl pyridinium benzyl quats. Exemplary compounds include methyl pyridinium chloride, ethyl pyridinium chloride, propyl pyridinium chloride, butyl pyridinium chloride, octyl pyridinium chloride, decyl pyridinium chloride, lauryl pyridinium chloride, cetyl pyridinium chloride, benzyl pyridinium chloride and an alkyl benzyl pyridinium chloride, preferably wherein the alkyl is a $C_1$-$C_6$ hydrocarbyl group. Preferably, the pyridinium compound includes benzyl pyridinium chloride.

The one or more additional corrosion inhibitors can be a phosphate ester, monomeric or oligomeric fatty acid, alkoxylated amine, or mixture thereof.

The one or more additional corrosion inhibitors can be a phosphate ester. Suitable mono-, di- and tri-alkyl as well as alkylaryl phosphate esters and phosphate esters of mono, di, and triethanolamine typically contain between from 1 to about 18 carbon atoms. Preferred mono-, di-and trialkyl phosphate esters, alkylaryl or arylalkyl phosphate esters are those prepared by reacting a $C_3$-$C_{18}$ aliphatic alcohol with phosphorous pentoxide. The phosphate intermediate interchanges its ester groups with triethylphosphate producing a broader distribution of alkyl phosphate esters.

Alternatively, the phosphate ester can be made by admixing with an alkyl diester, a mixture of low molecular weight alkyl alcohols or diols. The low molecular weight alkyl alcohols or diols preferably include $C_6$ to $C_{10}$ alcohols or diols. Further, phosphate esters of polyols and their salts containing one or more 2-hydroxyethyl groups, and hydroxylamine phosphate esters obtained by reacting polyphosphoric acid or phosphorus pentoxide with hydroxylamines such as diethanolamine or triethanolamine are preferred.

The one or more additional corrosion inhibitors can be a monomeric or oligomeric fatty acid. Preferred monomeric or oligomeric fatty acids are $C_{14}$-$C_{22}$ saturated and unsaturated fatty acids as well as dimer, trimer and oligomer products obtained by polymerizing one or more of such fatty acids.

The one or more additional corrosion inhibitors can be an alkoxylated amine. The alkoxylated amine can be an ethoxylated alkyl amine. The alkoxylated amine can be ethoxylated tallow amine.

On the other hand, in some embodiments, the disclosed corrosion control composition is free of any corrosion inhibitor, except the one or more cationic alkyl polyglycosides disclosed herein, since the cationic alkyl polyglycosides disclosed can function as both corrosion inhibitor and fouling control agent.

Dispersant

In some embodiments, the corrosion control compositions disclosed herein can further comprise a dispersant. A dispersant keeps particulate matter present in the water of a water system dispersed, so that it does not agglomerate. The composition can comprise from about 0.1 to 10 wt-%, from about 0.5 to 5 wt-%, or from about 0.5 to 4 wt-% of a dispersant, based on total weight of the composition.

A dispersant may be an acrylic acid polymer, maleic acid polymer, copolymer of acrylic acid with sulfonated monomers, alkyl esters thereof, or combination thereof. These polymers may include terpolymers of acrylic acid, acrylamide and sulfonated monomers. These polymers may also include quad-polymers consisting of acrylic acid and three other monomers.

Suitable dispersants include, but are not limited to, aliphatic phosphonic acids with 2-50 carbons, such as hydroxyethyl diphosphonic acid, and aminoalkyl phosphonic acids, e.g. polyaminomethylene phosphonates with 2-10 N atoms e.g. each bearing at least one methylene phosphonic acid group; examples of the latter are ethylenediamine tetra(methylene phosphonate), diethylenetriamine penta(methylene phosphonate), and the triamine- and tetramine-polymethylene phosphonates with 2-4 methylene groups between each N atom, at least 2 of the numbers of methylene groups in each phosphonate being different. Other suitable dispersion agents include lignin, or derivatives of lignin such as lignosulfonate and naphthalene sulfonic acid and derivatives.

The corrosion control composition can further comprise an organic sulfur compound, such as a mercaptoalkyl alcohol, mercaptoacetic acid, thioglycolic acid, 3,3'-dithiodipropionic acid, sodium thiosulfate, thiourea, L-cysteine, tert-butyl mercaptan, sodium thiosulfate, ammonium thiosulfate, sodium thiocyanate, ammonium thiocyanate, sodium metabisulfite, or a combination thereof. Preferably, the mercaptoalkyl alcohol comprises 2-mercaptoethanol. Such compounds are used as synergists in the composition. The organic sulfur compound can constitute from about 0.5 wt-% to about 15 wt-% of the composition, based on total weight of the composition, preferably from about 1 wt-% to about 10 wt-% and more preferably from about 1 wt-% to about 5 wt-%. The organic sulfur compound can constitute about 1 wt-%, about 2 wt-%, about 3 wt-%, about 4 wt-%, about 5 wt-%, about 6 wt-%, about 7 wt-%, about 8 wt-%, about 9 wt-%, about 10 wt-%, about 11 wt-%, about 12 wt-%, about 13 wt-%, about 14 wt-%, or about 15 wt-% of the composition.

The organic sulfur compound is usually used as synergist. In some embodiments, the corrosion control composition comprises from about 1 wt-% to about 20 wt-% of the organic sulfur compound. In some other embodiments, the corrosion control composition comprises from about 1 wt-% to about 5 wt-% of the organic sulfur compound.

In some embodiments, the corrosion control composition comprises about 1 wt-% to about 5 wt-% of the organic sulfur compound; about 10 wt-% to about 20 wt-% of an additional corrosion inhibitor; and about 10 wt-% to about 20 wt-% of the cationic alkyl polyglycoside. In some other embodiments, the corrosion control composition comprises about 1 wt-% to about 5 wt-% of the organic sulfur compound; about 10 wt-% to about 20 wt-% of an additional corrosion inhibitor; and about 10 wt-% to about 20 wt-% of the cationic alkyl polyglucoside.

In some embodiments, the corrosion control composition comprises about 1 wt-% to about 5 wt-% of the organic sulfur compound; about 10 wt-% to about 20 wt-% of an imidazoline; and about 10 wt-% to about 20 wt-% of one or more cationic alkyl polyglucosides. In some other embodiments, the corrosion control composition comprises about 1 wt-% to about 5 wt-% of the organic sulfur compound; about 10 wt-% to about 20 wt-% of a quaternary ammonium compound (e.g., quaternized alkyl pyridine, quinoline, alkyldimethylamine, etc); and about 10 wt-% to about 20 wt-% of the cationic alkyl polyglucoside. In some other embodiments, the corrosion control composition comprises about 1 wt-% to about 5 wt-% of the organic sulfur compound; about 10 wt-% to about 20 wt-% of a phosphate ester; and about 10 wt-% to about 20 wt-% of the cationic alkyl polyglucoside.

The corrosion control composition can further comprise a de-emulsifier. Preferably, the de-emulsifier comprises an oxyalkylate polymer, such as a polyalkylene glycol. The de-emulsifier can constitute from about 0.1 wt-% to about 10 wt-%, from about 0.5 wt-% to about 5 wt. %, or from about 0.5 wt-% to about 4 wt-% of the composition, based on total weight of the composition. The de-emulsifier can constitute about 0.5 wt-%, about 1 wt-%, about 1.5 wt-%, about 2 wt-%, about 2.5 wt-%, about 3 wt-%, about 3.5 wt-%, about 4 wt-%, about 4.5 wt-%, or about 5 wt-% of the composition.

The corrosion control composition can further comprise an asphaltene inhibitor. The composition can comprise from about 0.1 wt-% to about 10 wt-%, from about 0.1 wt-% to about 5 wt-%, or from about 0.5 wt-% to about 4 wt-% of an asphaltene inhibitor, based on total weight of the composition. Suitable asphaltene inhibitors include, but are not limited to, aliphatic sulfonic acids; alkyl aryl sulfonic acids; aryl sulfonates; lignosulfonates; alkylphenol/aldehyde resins and similar sulfonated resins; polyolefin esters; polyolefin imides; polyolefin esters with alkyl, alkylenephenyl or alkylenepyridyl functional groups; polyolefin amides; polyolefin amides with alkyl, alkylenephenyl or alkylenepyridyl functional groups; polyolefin imides with alkyl, alkylenephenyl or alkylenepyridyl functional groups; alkenyl/vinyl pyrrolidone copolymers; graft polymers of polyolefins with maleic anhydride or vinyl imidazole; hyperbranched polyester amides; polyalkoxylated asphaltenes, amphoteric fatty acids, salts of alkyl succinates, sorbitan monooleate, and polyisobutylene succinic anhydride.

The corrosion control composition can further comprise a paraffin inhibitor. The composition can comprise from about 0.1 wt-% to about 10 wt-%, from about 0.1 wt-% to about 5 wt-%, or from about 0.5 wt-% to about 4 wt-% of a paraffin inhibitor, based on total weight of the composition. Suitable paraffin inhibitors include, but are not limited to, paraffin crystal modifiers, and dispersant/crystal modifier combinations. Suitable paraffin crystal modifiers include, but are not limited to, alkyl acrylate copolymers, alkyl acrylate vinylpyridine copolymers, ethylene vinyl acetate copolymers, maleic anhydride ester copolymers, branched polyethylenes, naphthalene, anthracene, microcrystalline wax and/or asphaltenes. Suitable paraffin dispersants include, but are not limited to, dodecyl benzene sulfonate, oxyalkylated alkylphenols, and oxyalkylated alkylphenolic resins.

The corrosion control composition can further comprise a scale inhibitor. The composition can comprise from about 0.1 wt-% to about 20 wt-%, from about 0.5 wt-% to about 10 wt-%, or from about 1 wt-% to about 5 wt-% of a scale inhibitor, based on total weight of the composition. Suitable scale inhibitors include, but are not limited to, phosphates, phosphate esters, phosphoric acids, phosphonates, phosphonic acids, polyacrylamides, salts of acrylamidomethyl propane sulfonate/acrylic acid copolymer (AMPS/AA), phosphinated maleic copolymer (PHOS/MA), mono-, bis- and oligomeric phosphinosuccinic acid (PSO) derivatives, polycarboxylic acid, hydrophobically modified polycarboxylic acid, and salts of a polymaleic acid/acrylic acid/acrylamidomethyl propane sulfonate terpolymer (PMA/AA/AMPS).

The corrosion control composition can further comprise an emulsifier. The composition can comprise from about 0.1 wt-% to about 10 wt-%, from about 0.5 wt-% to about 5 wt-%, or from about 0.5 wt-% to about 4 wt-% of an emulsifier, based on total weight of the composition. Suitable emulsifiers include, but are not limited to, salts of carboxylic acids, products of acylation reactions between carboxylic acids or carboxylic anhydrides and amines, and alkyl, acyl and amide derivatives of saccharides (alkylsaccharide emulsifiers).

The corrosion control composition can further comprise a water clarifier. The composition can comprise from about 0.1 wt-% to about 10 wt-%, from about 0.5 wt-% to about 5 wt-%, or from about 0.5 wt-% to about 4 wt-% of a water clarifier, based on total weight of the composition. Suitable water clarifiers include, but are not limited to, inorganic metal salts such as alum, aluminum chloride, and aluminum chlorohydrate, or organic polymers such as acrylic acid-based polymers, acrylamide-based polymers, polymerized amines, alkanolamines, thiocarbamates, and cationic polymers such as diallyldimethylammonium chloride (DADMAC).

The corrosion control composition can further comprise an emulsion breaker. The composition can comprise from about 0.1 wt-% to about 10 wt-%, from about 0.5 wt-% to about 5 wt-%, or from about 0.5 wt-% to about 4 wt-% of an emulsion breaker, based on total weight of the composition. Suitable emulsion breakers include, but are not limited to, dodecylbenzylsulfonic acid (DDBSA), the sodium salt of xylenesulfonic acid (NAXSA), epoxylated and propoxylated compounds, and resins, such as phenolic and epoxide resins.

The corrosion control composition can further comprise a hydrogen sulfide scavenger. The composition can comprise from about 1 wt-% to about 50 wt-%, from about 1 wt-% to about 40 wt-%, from about 1 wt-% to about 30 wt-%, from about 0.1 wt-% to about 10 wt-%, from about 0.5 wt-% to about 5 wt-%, or from about 0.5 wt-% to about 4 wt-% of a hydrogen sulfide scavenger, based on total weight of the composition. Suitable additional hydrogen sulfide scavengers include, but are not limited to, oxidants (e.g., inorganic peroxides such as sodium peroxide or chlorine dioxide); aldehydes (e.g., of 1-10 carbons such as formaldehyde, glyoxal, glutaraldehyde, acrolein, or methacrolein; triazines (e.g., monoethanolamine triazine, monomethylamine triazine, and triazines from multiple amines or mixtures thereof); condensation products of secondary or tertiary amines and aldehydes, and condensation products of alkyl alcohols and aldehydes.

The corrosion control composition can further comprise a gas hydrate inhibitor. The composition can comprise from about 0.1 wt-% to about 25 wt-%, from about 0.5 wt-% to about 20 wt-%, from about 1 wt-% to about 10 wt-%, from about 0.1 wt-% to about 10 wt-%, from about 0.5 wt-% to about 5 wt-%, or from about 0.5 wt-% to about 4 wt-% of a gas hydrate inhibitor, based on total weight of the composition. Suitable gas hydrate inhibitors include, but are not limited to, thermodynamic hydrate inhibitors (THI), kinetic hydrate inhibitors (KHI), and anti-agglomerates (AA). Suitable thermodynamic hydrate inhibitors include, but are not limited to, sodium chloride, potassium chloride, calcium chloride, magnesium chloride, sodium bromide, formate brines (e.g. potassium formate), polyols (such as glucose, sucrose, fructose, maltose, lactose, gluconate, monoethylene glycol, diethylene glycol, triethylene glycol, mono-propylene glycol, dipropylene glycol, tripropylene glycols, tetrapropylene glycol, monobutylene glycol, dibutylene glycol, tributylene glycol, glycerol, diglycerol, triglycerol, and sugar alcohols (e.g. sorbitol, mannitol)), methanol, propanol, ethanol, glycol ethers (such as diethyleneglycol monomethylether, ethyleneglycol monobutylether), and alkyl or cyclic esters of alcohols (such as ethyl lactate, butyl lactate, methylethyl benzoate).

The corrosion control composition can further comprise a kinetic hydrate inhibitor. The composition can comprise from about 0.1 wt-% to about 25 wt-%, from about 0.5 wt-% to about 20 wt-%, from about 1 wt-% to about 10 wt-%, from about 0.1 wt-% to about 10 wt-%, from about 0.5 wt-% to about 5 wt-%, or from about 0.5 wt-% to about 4 wt-% of a kinetic hydrate inhibitor, based on total weight of the composition. Suitable kinetic hydrate inhibitors and anti-agglomerates include, but are not limited to, polymers and copolymers, polysaccharides (such as hydroxyethylcellulose (HEC), carboxymethylcellulose (CMC), starch, starch derivatives, and xanthan), lactams (such as polyvinylcaprolactam, polyvinyl lactam), pyrrolidones (such as polyvinyl pyrrolidone of various molecular weights), fatty acid salts, ethoxylated alcohols, propoxylated alcohols, sorbitan esters, ethoxylated sorbitan esters, polyglycerol esters of fatty acids, alkyl glucosides, alkyl polyglucosides, alkyl sulfates, alkyl sulfonates, alkyl ester sulfonates, alkyl aromatic sulfonates, alkyl betaine, alkyl amido betaines, hydrocarbon based dispersants (such as lignosulfonates, iminodisuccinates, polyaspartates), amino acids, and proteins.

The corrosion control composition can further comprise a pH modifier. The composition can comprise from about 0.1 wt-% to about 20 wt-%, from about 0.5 wt-% to about 10 wt-%, or from about 0.5 wt-% to about 5 wt-% of a pH modifier, based on total weight of the composition. Suitable pH modifiers include, but are not limited to, alkali hydroxides, alkali carbonates, alkali bicarbonates, alkaline earth metal hydroxides, alkaline earth metal carbonates, alkaline earth metal bicarbonates and mixtures or combinations thereof. Exemplary pH modifiers include sodium hydroxide, potassium hydroxide, calcium hydroxide, calcium oxide, sodium carbonate, potassium carbonate, sodium bicarbonate, potassium bicarbonate, magnesium oxide, and magnesium hydroxide.

The corrosion control composition can further comprise a fouling control agent. In some embodiments, the fouling control agent is fouling control agent a single quaternary compound. The composition can comprise from about 0.1 wt-% to about 10 wt-%, from about 0.5 wt-% to about 5 wt-%, or from about 0.5 wt-% to about 4 wt-% of a fouling control agent, based on total weight of the composition.

On the other hand, in some embodiments, the disclosed corrosion control composition is free of any fouling control agent, except the one or more cationic alkyl polyglycosides disclosed herein, since the cationic alkyl polyglycosides disclosed can function as both corrosion inhibitor and fouling control agent.

The corrosion control composition can further comprise a surfactant. The composition can comprise from about 0.1 wt-% to about 10 wt-%, from about 0.5 wt-% to about 5 wt-%, or from about 0.5 wt-% to about 4 wt-% of a surfactant, based on total weight of the composition. A suitable surfactant can be a nonionic, semi-nonionic, cat-ionic, anionic, amphoteric, zwitterionic, Gemini, di-cationic, di-anionic surfactant, or mixtures thereof.

The corrosion control composition can further comprise additional corrosion control composition agents that provide a functional and/or beneficial property. For example, additional corrosion control composition agents can be a sequestrant, solubilizer, lubricant, buffer, cleaning agent, rinse aid, preservative, binder, thickener or other viscosity modifier, processing aid, water-conditioning agent, foam inhibitor or foam generator, threshold agent or system, aesthetic enhancing agent (e.g., dye, odorant, perfume), or other agents suitable for formulation with the corrosion control composition, and mixtures thereof. Additional agents or additives will vary according to the specific corrosion control composition being manufactured and its intend use as one skilled in the art will appreciate.

Alternatively, the corrosion control composition does not contain or is free of any of the additional corrosion control composition agents.

Additionally, the corrosion control composition can be formulated into compositions comprising the following components as shown in Table 1. These formulations include the ranges of the components listed and can optionally include additional agents. The values in the Table 1 below are weight percentages.

TABLE 1

Exemplary Corrosion control compositions

| Component | 1 | 2 | 3 | 4 | 5 | 6 | 7 | 8 | 9 | 10 | 11 | 12 |
|---|---|---|---|---|---|---|---|---|---|---|---|---|
| Cationic Alkyl Polyglycoside | 0.1-20 | 0.1-20 | 0.1-20 | 0.1-20 | 0.1-20 | 0.1-20 | 10-20 | 10-20 | 10-20 | 10-20 | 10-20 | 0.1-20 |
| Surfactant | 5-40 | — | 5-50 | — | 5-50 | 5-50 | 5-40 | — | 5-50 | — | — | 10-20 |
| Additional corrosion inhibitor | 0.1-20 | 0.1-20 | — | — | — | — | 0.1-20 | 0.1-20 | — | — | — | 0.1-20 |
| Preservative | 0.1-5 | 0.1-5 | 0.1-5 | 0.1-5 | — | — | 0.1-5 | 0.1-5 | 0.1-5 | — | — | 0.1-5 |
| Scale inhibitor | 1-10 | 1-10 | 1-10 | 1-10 | 1-10 | — | 1-10 | 1-10 | 1-10 | 1-10 | — | 1-10 |
| Water Clarifier | — | — | — | — | — | — | — | — | — | — | — | 0.1-25 |
| Biocide | 0.5-5 | 0.5-5 | 0.5-5 | 0.5-5 | 0.5-5 | 0.5-5 | 0.5-5 | 0.5-5 | 0.5-5 | 0.5-5 | 0.5-5 | |
| Water | 0.00 | 0-40 | 0-10 | 0-60 | 0-15 | 0-25 | 0.00 | 0-40 | 0-10 | 0-65 | 0-75 | |

| Component | 13 | 14 | 15 | 16 | 17 | 18 | 19 | 20 | 21 | 22 | 23 | 24 |
|---|---|---|---|---|---|---|---|---|---|---|---|---|
| Cationic Alkyl Polyglycoside | 0.1-20 | 0.1-20 | 0.1-20 | 0.1-20 | 0.1-20 | 0.1-20 | 10-20 | 10-20 | 10-20 | 10-20 | 10-20 | 10-20 |
| Surfactant | — | 10-20 | — | 10-35 | 10-35 | — | 10-15 | — | — | 10-35 | 10-35 | — |
| Additional Corrosion inhibitor | 0.1-20 | 0.1-20 | 0.1-20 | 0.1-20 | 0.1-20 | 0.1-20 | 0.1-20 | 0.1-20 | 0.1-20 | 0.1-20 | 0.1-20 | 0.1-20 |
| Preservative | 0.1-5 | — | — | — | — | — | 0.1-5 | — | — | — | — | — |
| Scale inhibitor | 1-10 | 1-10 | — | — | 1-10 | — | 1-10 | 1-10 | — | — | — | 1-10 |
| Water Clarifier | 0.1-25 | 0.1-25 | 0.1-25 | — | — | — | 0.1-25 | 0.1-25 | 0.1-25 | — | 0.1-25 | — |
| Biocide | — | — | — | — | — | 0.5-5 | 0.5-5 | 0.5-5 | 0.5-5 | 0.5-5 | — | — |
| Water | 0-20 | 0-5 | 0-35 | 0-25 | 0-15 | 0-55 | 0.00 | 0-20 | 0-30 | 0-20 | 0.00 | 0-50 |

In some embodiments, the corrosion control composition can further comprise a primary alkalinity source. In some embodiments, the corrosion control composition disclosed here is a detergent composition that comprises one or more cationic alkyl polyglycoside and a primary alkalinity source. A detergent composition, as used herein, refers to a composition that contains more primary alkalinity source than the cationic alkyl polyglycoside in weight percentage and can generate an alkaline use solution having a use solution pH of from about 8 to about 13.

In some embodiments, the corrosion control composition disclosed here is a detergent composition that comprises one or more cationic alkyl polyglycosides, a primary alkalinity source, and a chelant. In some embodiments the corrosion control composition disclosed here is a detergent composition that comprises one or more cationic alkyl polyglycosides, a primary alkalinity source, chelant, and surfactant. In some embodiments, the corrosion control composition disclosed here is a detergent composition that comprises one or more cationic alkyl polyglycosides, a primary alkalinity source, and chelant, but is free of an anionic, amphoteric, nonionic, zwitterionic surfactant, or combination thereof.

In some embodiments, the corrosion control composition disclosed here is a detergent composition that comprises one or more cationic alkyl polyglycosides, a primary alkalinity source, and enzyme. In some embodiments, the corrosion control composition disclosed here is a detergent composition that comprises one or more cationic alkyl polyglycosides, a primary alkalinity source, chelant, enzyme, and surfactant. In some embodiments, the corrosion control composition disclosed here is a detergent composition that comprises one or more cationic alkyl polyglycosides, a primary alkalinity source, and enzyme, but is free of a surfactant, chelant, or both.

In some embodiments, the primary alkalinity source comprises an alkali metal hydroxide, alkali metal carbonate, alkali metal silicate, alkali metal silicate, amine, or mixture thereof. In some other embodiments, the primary alkalinity source comprises an alkali metal hydroxide, alkali metal carbonate, or mixture thereof.

In some embodiments, the corrosion control composition or detergent composition disclosed herein include a builder. In some embodiments, the detergent composition disclosed herein is free of a builder but includes a part of the primary alkalinity source as builder.

In some embodiments, the corrosion control composition or detergent composition disclosed herein include an enzyme, wherein the enzyme is amylase, protease, lipase, cellulase, cutinase, gluconase, peroxidase, and/or mixtures thereof. In some embodiments, the enzyme is a protease enzyme. In some other embodiments, the enzyme is a protease and amylase. In some other embodiments, the enzyme is a protease, amylase, and a lipase. In yet some other embodiments, the detergent composition or composition disclosed herein is free of an enzyme.

In some embodiments, the corrosion control composition or detergent composition disclosed here include a chelant, wherein the chelant is methylglycinediacetic acid (MGDA), glutamic acid-N,N-diacetic acid (GLDA), N-hydroxyethyl-ammiodiacetic acid, ethylenediaminetetraacetic acid (EDTA) (including tetra sodium EDTA), hydroxyethylene-diaminetetraacetic acid, diethylenetriaminepentacetic acid, N-hydroxyethyl-ethylenediaminetriacetic acid (HEDTA), diethylenetriaminepentaacetic acid (DTPA), ethylenediaminesuccinic acid (EDDS), 2-hydroxyethyliminodiacetic acid (HEIDA), iminodisuccinic acid (IDS), 3-hydroxy-2-2'-iminodisuccinic acid (RIDS), or a mixture thereof.

In other embodiments, the corrosion control composition or detergent composition disclosed herein further include one or more addition detergent composition agents.

In some embodiments, the corrosion control composition or detergent compositions disclosed herein are solid compositions. In some other embodiments, the detergent compositions are liquid. In some embodiments, the solid detergent compositions disclosed herein are any pressed, extruded, or cast solid compositions, or in loose powder forms. In some other embodiments, the solid detergent composition is pressed and/or extruded blocks. In some other embodiments, the detergent compositions are multiple-use pressed solid block compositions.

A multi-use solid block detergent composition is preferred because the solid block detergent composition provides solid state stability and can be used in a dispenser. The use of solidification technology and solid block detergents for institutional and industrial operations is set forth for example with respect to the SOLID POWER® brand technology such as disclosed in U.S. Reissue Patent Nos. 32,762 and 32,818. In some embodiments, the detergent compositions disclosed herein include sodium carbonate hydrate cast solid products as disclosed by Heile et al., U.S. Pat. Nos. 4,595,520 and 4,680,134. Each of these references are herein incorporated by reference in its entirety. Without being limited according to a mechanism of action, the solidification mechanism is ash hydration or the interaction of the sodium carbonate with water.

Primary Alkalinity Source

The disclosed composition can include a primary alkalinity source, especially when the disclosed composition is a detergent composition.

The primary alkalinity source of the composition or detergent composition disclosed herein can include, for example, an alkali metal hydroxide, alkali metal carbonate, alkali metal silicate, alkali metal metasilicate or mixture thereof. Examples of suitable alkalinity sources include, but are not limited to, sodium hydroxide, potassium hydroxide, sodium carbonate, potassium carbonate, sodium silicate, sodium metasilicate, potassium silicate, or a mixture thereof. The alkalinity source is preferably an alkali hydroxide, alkali carbonate, or mixture thereof. The alkalinity source controls the pH of the resulting use solution of the composition disclosed when water or other diluent is added to the composition to form a use solution.

When the disclosed composition is a detergent composition, the pH of the use solution must be maintained in the alkaline range to provide sufficient detergency properties. Therefore, the disclosed detergent composition comprises more primary alkalinity source than the cationic alkyl polyglycoside or polyglucoside compounds in term of weight percentage.

A use solution of a composition disclosed herein as used herein refers to a diluted solution for the composition by a diluent. A diluent as used herein refers to water, city water, distilled water, or carrier solvents defined herein. The composition or the compounds can be diluted by a factor of 0.5, 1, 2, 3, 4, 5, 6, 7, 8, 9, 10, 11-1,000,000, or any value there between to generate a use solution and then use the use solution for this application. In this disclosure, when a composition disclosed herein is applied, either the composition or use solution thereof is applied.

When the disclosed composition is a detergent composition, the pH of a use solution of the detergent composition is defined as the pH that is determined at room temperature when the use solution is obtained by diluting the detergent composition with distilled water and contains from 0.1 g/L to about 3 g/L of the primary alkalinity source. In some embodiments, the concentration of the primary alkalinity source is from about 0.1 g/L to about 0.5 g/L, from about 0.5 g/L to about 1 g/L, from about 1 g/L to about 3 g/L, from about 1 g/L to about 2 g/L, from about 2 g/L to about 3 g/L, about 0.1 g/L, about 0.2 g/L, about 0.3 g/L, about 0.4 g/L, about 0.5 g/L, about 1.0 g/L, about 1.5 g/L, about 2.0 g/L, about 2.5 g/L, about 3.0 g/L, or any value there between in the use solution.

Alternatively, when the disclosed composition is a detergent composition, the pH of a use solution of the detergent composition is defined as the pH that is determined at room temperature when the use solution is obtained by diluting the detergent composition with distilled water and contains from 0.5 g/L to about 5 g/L of the composition. In some embodiments, the concentration of the composition is from about from about 0.5 g/L to about 1 g/L, from about 1 g/L to about 2 g/L, from about 2 g/L to about 3 g/L, from about 3 g/L to about 4 g/L, from about 4 g/L to about 5 g/L, about 0.5 g/L, about 1.0 g/L, about 1.5 g/L, about 2.0 g/L, about 2.5 g/L, about 3.0 g/L, about 3.5 g/L, about 4.0 g/L, about 4.5 g/L, about 5.0 g/L or any value there between in the use solution.

In some embodiments, a use solution of the detergent composition therefore provides a pH of at least about 8, preferably a pH of from about 9.5 to about 12, more preferably from about 10 to about 11 or from about 11 to about 12, when its primary alkalinity source is at a concentration of about 0.1 g/L, about 0.2 g/L, about 0.5 g/L, about 0.8 g/L, or about 1 gram per liter (g/L). In some embodiments, a use solution of the detergent composition therefore provides a pH of at least 8, preferably a pH of 9.5 to 11, more preferably 10 to 11, from about 11 to about 12, when its primary alkalinity source in distilled water is at a concentration of about 1 g/L, about 1.5 g/L, about 2.0 g/L, about 2.5 g/L, about 3 g/L, or any value there between.

In some other embodiments, a use solution of the detergent composition therefore provides a pH of at least about 8, preferably a pH of from about 9.5 to about 12, more preferably from about 10 to about 11 or from about 11 to about 12, when the composition itself is at a concentration of about 0.5 g/L, about 0.8 g/L, about 1 g/L, about 1.5 g/L, about 2.0 g/L, about 2.5 g/L, about 3.0 g/L, about 3.5 g/L, about 4.0 g/L, about 4.5 g/L, or about 5.0 g/L. In some embodiments, a use solution of the detergent composition therefore provides a pH of at least 8, preferably a pH of 9.5 to 11, more preferably 10 to 11, from about 11 to about 12, when the composition itself is at a concentration of about 1 g/L, about 1.5 g/L, about 2.0 g/L, about 2.5 g/L, about 3 g/L, about 3.5 g/L, about 4.0, g/L, about 4.5 g/L, about 5.0 g/L, or any value there between.

In some embodiments, the pH of the use solution is between about 10 and about 13. In some embodiments, the pH of the use solution is between about 8 and about 10. Particularly, the pH of the use solution is about 11-12. If the pH of the use solution is too low, for example, below approximately 10, the use solution may not provide adequate detergency properties. Further, at lower pH levels, the silicate species become unstable and may precipitate out of solution. If the pH of the use solution is too high, for example, above approximately 13, the use solution may be too alkaline and attack or damage the surface to be cleaned. A further consideration for the pH is that if the composition is too alkaline, a user would be required to wear PPE. However, if the pH of the composition is at or below about 11.5 pH, PPE is not required. Therefore, it is desirable for the pH of the detergent composition disclosed herein in diluted use form to be between about 11 and about 12 for the composition to be effective, but not corrosive to human skin.

Preferably, the primary alkalinity source is an alkali metal hydroxide. Preferred alkali metal hydroxides include sodium hydroxide and potassium hydroxide. More preferably, the primary alkalinity source is sodium hydroxide. Sodium carbonate can be of light density or heavy density.

When a carbonate is included in the disclosed detergent composition, an effective amount of the alkali metal carbonate is an amount that provides a use solution having a pH of at least 8, preferably a pH of 9.5 to 11, more preferably 10 to 10.3.

In general, when the primary alkalinity source is present in the disclosed detergent composition at a concentration of at least about 1 wt-%, the composition or a use solution of the composition can emulsify fats and oils present. When the primary alkalinity source is present in a concentration of about 3 wt-% or greater, the composition or a use solution of the composition can emulsify, suspend, and separate oils and fats after treatment.

In some embodiments where the disclosed composition is not a detergent composition, the composition is free of a primary alkalinity source.

Builder

The detergent compositions disclosed herein include one or more builders. In some embodiments, a builder may also serve as a part of the primary alkalinity source in the detergent compositions. In some embodiments, the builder includes a carbonate, hydroxide, metasilicate, or mixture thereof. In some embodiments, a carbonate can assist in providing solid detergent compositions, as the carbonate can act as a hydratable salt.

Examples of suitable builders include, but are not limited to alkali metal carbonates, alkali metal hydroxides, and alkali metal silicates. Exemplary alkali metal carbonates that can be used include, but are not limited to, sodium or potassium carbonate, bicarbonate, sesquicarbonate, and mixtures thereof. Exemplary alkali metal hydroxides that can be used include, but are not limited to, sodium or potassium hydroxide. The alkali metal hydroxide may be added to the composition in any form known in the art, including as solid beads, dissolved in an aqueous solution, or a combination thereof. Examples of alkali metal silicates include, but are not limited to, sodium or potassium silicate or polysilicate, sodium or potassium metasilicate and hydrated sodium or potassium metasilicate or a combination thereof.

In some embodiments, the composition is free of a builder.

Chelant

The detergent composition disclosed herein may also include a chelant. Chelants include, but are not limited to, chelating agents (chelators), sequestering agents (sequestrants), detergent builders, and the like. Examples of chelants include, but are not limited to, phosphonates, phosphates, aminocarboxylates and their derivatives, pyrophosphates, polyphosphates, ethylenediamine and ethylenetriamine derivatives, hydroxyacids, and mono-, di-, and tri-carboxylates and their corresponding acids. Other exemplary chelants include aluminosilicates, nitroloacetates and their derivatives, and mixtures thereof.

Suitable aminocarboxylic acids according to the invention include, but are not limited to, methylglycinediacetic acid (MGDA), glutamic acid-N,N-diacetic acid (GLDA), N-hydroxyethylaminodiacetic acid, ethyl ethylenediaminetetraacetic acid (EDTA) (including tetra sodium EDTA), hydroxyethylenediaminetetraacetic acid, diethylenetriaminepentaacetic acid, N-hydroxyethyl-ethylenediaminetriacetic acid (HEDTA), diethylenetriaminepentaacetic acid (DTPA), ethylenediaminesuccinic acid (EDDS), 2-hydroxyethyliminodiacetic acid (HEIDA), iminodisuccinic acid (IDS), 3-hydroxy-2-2'-iminodisuccinic acid (EMS) and other similar acids or salts thereof having an amino group with a carboxylic acid substituent. Additional description of suitable aminocarboxylates suitable for use as chelating agents and/or sequestrants is set forth in Kirk-Othmer. Encyclopedia of Chemical Technology, Third. Edition, volume 5, pages 339-366 and volume 23, pages 319-320, the disclosure of which is incorporated by reference herein.

Chelants can be water soluble, and/or biodegradable. Other exemplary chelants include TKPP (tetrapotassium pyrophosphate), PAA (polyacrylic acid) and its salts, phosphonobutane carboxylic acid, Alanine,N,N-bis(carboxymethyl)-,trisodium salt, and sodium gluconate.

In some embodiments, the chelant is free of phosphorus. In some embodiments, the chelant may also serve as a solidifying agent to help form the solid composition, such as sodium salts of citric acid.

Preferably, the chelant is a sodium salt of aminocarboxylates. More preferably, the chelant is methyl glycine diacetic acid (MGDA). Synergistic water conditioning is achieved when using methyl glycine diacetic acid (MGDA) in combination with poly acrylic acids and its salts.

In some embodiments, the composition disclosed herein is free of a chelant, detergent builder, or both. In some embodiments, the composition disclosed herein is free of a chelant, detergent builder, or both that contain phosphorus.

Scale Inhibitor

The reverse emulsion breaker composition can further comprise a scale inhibitor. Suitable scale inhibitors include, but are not limited to, phosphates, phosphate esters, phosphoric acids, phosphonates, phosphonic acids, polyacrylamides, salts of Sacrylamidomethyl propane sulfonate/acrylic acid copolymer (AMPS/AA), phosphinated maleic copolymer (PHOS/MA), mono-, bis- and oligomeric phosphinosuccinic acid (PSO) derivatives, polycarboxylic acid, hydrophobically modified polycarboxylic acid, and salts of a polymaleic acid/acrylic acid/acrylamidomethyl propane sulfonate terpolymer (PMA/AA/AMPS).

In some embodiments, the composition disclosed herein is free of a scale inhibitor.

Enzyme

The compositions or detergent compositions disclosed herein can include an enzyme. An enzyme in the detergent compositions enhances removal of soils, prevents re-deposition, and/or reduces foam during applications of the detergent compositions or their use solutions. The function of an enzyme is to break down adherent soils, such as starch or proteinaceous materials, typically found in soiled surfaces and removed by a detergent composition into a wash water source.

Exemplary types of enzymes which can be incorporated into the detergent compositions disclosed herein include, but are not limited to, amylase, protease, lipase, cellulase, cutinase, gluconase, peroxidase, and/or mixtures thereof. A composition disclosed herein may employ more than one enzyme, from any suitable origin, such as vegetable, animal, bacterial, fungal or yeast origin. In some embodiments, the enzyme is a protease. As used herein, the terms "protease" or "proteinase" refer enzymes that catalyze the hydrolysis of peptide bonds.

As one skilled in the art shall ascertain, enzymes are designed to work with specific types of soils. For example, according to an embodiment of the invention, ware wash applications may use a protease enzyme as it is effective at the high temperatures of the ware wash machines and is effective in reducing protein-based soils. Protease enzymes are particularly advantageous for cleaning soils containing protein, such as blood, cutaneous scales, mucus, grass, food (e.g., egg, milk, spinach, meat residue, tomato sauce), or the like. Protease enzymes are capable of cleaving macromolecular protein links of amino acid residues and convert substrates into small fragments that are readily dissolved or dispersed into the aqueous use solution. Proteases are often referred to as detersive enzymes due to the ability to break soils through the chemical reaction known as hydrolysis. Protease enzymes can be obtained, for example, from *Bacillus subtilis*, *Bacillus licheniformis* and *Streptomyces griseus*. Protease enzymes are also commercially available as serine endoproteases.

Examples of commercially-available protease enzymes are available under the following trade names: Esperase, Purafect, Purafect L, Purafect Ox, Everlase, Liquanase, Savinase, Prime L, Prosperase and Blap.

The enzyme to be included into the detergent composition may be an independent entity and/or may be formulated in combination with the detergent composition. In some embodiments, the enzyme may be formulated into a detergent composition in either liquid or solid formulations. In addition, enzyme compositions may be formulated into various delayed or controlled release formulations. For example, a solid molded detergent composition may be prepared without the addition of heat. As a skilled artisan will appreciate, enzymes tend to become denatured by the application of heat and therefore use of enzymes within detergent compositions require methods of forming detergent compositions that does not rely upon heat as a step in the formation process, such as solidification.

The enzyme composition may further be obtained commercially in a solid (e.g., puck, powder, etc.) or liquid formulation. Commercially-available enzymes are generally combined with stabilizers, buffers, cofactors and inert vehicles. The actual active enzyme content depends upon the method of manufacture, which is well known to a skilled artisan and such methods of manufacture are not critical to the present invention.

Alternatively, the enzyme composition may be provided separate from the detergent composition, such as added directly to a use solution of a detergent composition or a wash liquor, or wash water of an application, e.g. dishwasher.

Other Additional Detergent Composition Agent

The detergent composition disclosed herein may include one or more additional detergent composition agents. Exemplary additional detergent composition agents include, but are not limited to, a threshold agent; crystal modifier; hardening agent; bleaching agent; peroxycarboxylic acid, peroxycarboxylic acid composition, filler; defoaming agent; anti-redeposition agent; stabilizing agent; dispersant; fragrance and dye; and thickener.

In some embodiments, the detergent composition disclosed herein is free of one, more, or all the additional detergent composition agents.

Anionic Surfactants

Anionic surfactants are surface active substances in which the charge on the hydrophobe is negative; or surfactants in which the hydrophobic section of the molecule carries no charge unless the pH is elevated to neutrality or above (e.g., carboxylic acids). Carboxylate, sulfonate, sulfate and phosphate are the polar (hydrophilic) solubilizing groups found in anionic surfactants. Of the cations (counter ions) associated with these polar groups, sodium, lithium and potassium impart water solubility; ammonium and substituted ammonium ions provide both water and oil solubility; and, calcium, barium, and magnesium promote oil solubility. As those skilled in the art understand, anionic surfactants are excellent detersive surfactants and are therefore favored additions to heavy duty detergent compositions.

Anionic sulfate surfactants suitable for use in the present compositions include alkyl ether sulfates, alkyl sulfates, the linear and branched primary and secondary alkyl sulfates, alkyl ethoxysulfates, fatty oleyl glycerol sulfates, alkyl phenol ethylene oxide ether sulfates, the $C_5$-$C_{17}$ acyl-N—($C_1$-$C_4$ alkyl) and —N—($C_1$-$C_2$ hydroxyalkyl) glucamine sulfates, and sulfates of alkylpolysaccharides such as the sulfates of alkylpolyglucoside, and the like. Also included are the alkyl sulfates, alkyl poly(ethyleneoxy) ether sulfates and aromatic poly(ethyleneoxy) sulfates such as the sulfates or condensation products of ethylene oxide and nonyl phenol (usually having 1 to 6 oxyethylene groups per molecule).

Anionic sulfonate surfactants suitable for use in the present compositions also include alkyl sulfonates, the linear and branched primary and secondary alkyl sulfonates, and the aromatic sulfonates with or without substituents.

Anionic carboxylate surfactants suitable for use in the present compositions include carboxylic acids (and salts), such as alkanoic acids (and alkanoates), ester carboxylic acids (e.g., alkyl succinates), ether carboxylic acids, sulfonated fatty acids, such as sulfonated oleic acid, and the like. Such carboxylates include alkyl ethoxy carboxylates, alkyl aryl ethoxy carboxylates, alkyl polyethoxy polycarboxylate surfactants and soaps (e.g., alkyl carboxyls). Secondary carboxylates useful in the present compositions include those which contain a carboxyl unit connected to a secondary carbon. The secondary carbon can be in a ring structure, e.g., as in p-octyl benzoic acid, or as in alkyl-substituted cyclohexyl carboxylates. The secondary carboxylate surfactants typically contain no ether linkages, no ester linkages and no hydroxyl groups. Further, they typically lack nitrogen atoms in the group-group (amphiphilic portion). Suitable secondary soap surfactants typically contain 11-13 total carbon atoms, although more carbons atoms (e.g., up to 16) can be present. Suitable carboxylates also include acylamino acids (and salts), such as acylgluamates, acyl peptides, sarcosinates (e.g., N-acyl sarcosinates), taurates (e.g., N-acyl taurates and fatty acid amides of methyl tauride), and the like.

Suitable anionic surfactants include alkyl or alkylaryl ethoxy carboxylates of the following formula:

$$R-O-(CH_2CH_2O)_n(CH_2)_m-CO_2X \qquad (3)$$

in which R is a $C_8$ to $C_{22}$ alkyl group or

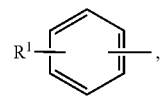

in which $R^1$ is a $C_4$-$C_{16}$ alkyl group; n is an integer of 1-20; m is an integer of 1-3; and X is a counter ion, such as hydrogen, sodium, potassium, lithium, ammonium, or an amine salt such as monoethanolamine, diethanolamine or triethanolamine. In some embodiments, n is an integer of 4 to 10 and m is 1. In some embodiments, R is a $C_5$-$C_{16}$ alkyl group. In some embodiments, R is a $C_{12}$-$C_{14}$ alkyl group, n is 4, and m is 1.

In other embodiments, R is

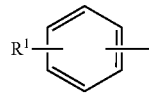

and $R^1$ is a $C_6$-$C_{12}$ alkyl group. In still yet other embodiments, $R^1$ is a $C_9$ alkyl group, n is 10 and m is 1.

Such alkyl and alkylaryl ethoxy carboxylates are commercially available. These ethoxy carboxylates are typically available as the acid forms, which can be readily converted to the anionic or salt form. Commercially available carboxylates include, Neodox 23-4, a $C_{12}$-13 alkyl polyethoxy (4) carboxylic acid (Shell Chemical), and Emcol CNP-110, a $C_9$ alkylaryl polyethoxy (10) carboxylic acid (Witco Chemical). Carboxylates are also available from Clariant, e.g., the product Sandopan® DTC, a $C_{13}$ alkyl polyethoxy (7) carboxylic acid.

In some embodiments, the composition or detergent composition disclosed herein is free of an anionic surfactant.

Nonionic Surfactants

Useful nonionic surfactants are generally characterized by the presence of an organic hydrophobic group and an organic hydrophilic group and are typically produced by the condensation of an organic aliphatic, alkyl aromatic or polyoxyalkylene hydrophobic compound with a hydrophilic alkaline oxide moiety which in common practice is ethylene oxide or a polyhydration product thereof, polyethylene glycol. Practically any hydrophobic compound having a hydroxyl, carboxyl, amino, or amido group with a reactive hydrogen atom can be condensed with ethylene oxide, or its polyhydration adducts, or its mixtures with alkoxylenes such as propylene oxide to form a nonionic surface-active agent. The length of the hydrophilic polyoxyalkylene moiety which is condensed with any particular hydrophobic compound can be readily adjusted to yield a water dispersible or water-soluble compound having the desired degree of balance between hydrophilic and hydrophobic properties. Useful nonionic surfactants include:

Block polyoxypropylene-polyoxyethylene polymeric compounds based upon propylene glycol, ethylene glycol, glycerol, trimethylolpropane, and ethylenediamine as the initiator reactive hydrogen compound. Examples of polymeric compounds made from a sequential propoxylation and ethoxylation of initiator are commercially available from BASF Corp. One class of compounds are difunctional (two reactive hydrogens) compounds formed by condensing ethylene oxide with a hydrophobic base formed by the addition of propylene oxide to the two hydroxyl groups of propylene glycol. This hydrophobic portion of the molecule weighs from about 1,000 to about 4,000. Ethylene oxide is then added to sandwich this hydrophobe between hydrophilic groups, controlled by length to constitute from about 10% by weight to about 80% by weight of the final molecule. Another class of compounds are tetra-flinctional block copolymers derived from the sequential addition of propylene oxide and ethylene oxide to ethylenediamine. The molecular weight of the propylene oxide hydrotype ranges from about 500 to about 7,000; and, the hydrophile, ethylene oxide, is added to constitute from about 10% by weight to about 80% by weight of the molecule.

Condensation products of one mole of alkyl phenol wherein the alkyl chain, of straight chain or branched chain configuration, or of single or dual alkyl constituent, contains from about 8 to about 18 carbon atoms with from about 3 to about 50 moles of ethylene oxide. The alkyl group can, for example, be represented by diisobutylene, di-amyl, polymerized propylene, iso-octyl, nonyl, and di-nonyl. These surfactants can be polyethylene, polypropylene, and poly-butylene oxide condensates of alkyl phenols. Examples of commercial compounds of this chemistry are available on the market under the trade names Igepal® manufactured by Rhone-Poulenc and Triton® manufactured by Union Carbide.

Condensation products of one mole of a saturated or unsaturated, straight or branched chain alcohol having from about 6 to about 24 carbon atoms with from about 3 to about 50 moles of ethylene oxide. The alcohol moiety can consist of mixtures of alcohols in the above delineated carbon range or it can consist of an alcohol having a specific number of carbon atoms within this range. Examples of like commercial surfactant are available under the trade names Lutensol™, Dehydol™ manufactured by BASF, Neodol™ manufactured by Shell Chemical Co. and Alfonic™ manufactured by Vista Chemical Co.

Condensation products of one mole of saturated or unsaturated, straight or branched chain carboxylic acid having from about 8 to about 18 carbon atoms with from about 6 to about 50 moles of ethylene oxide. The acid moiety can consist of mixtures of acids in the above defined carbon atoms range or it can consist of an acid having a specific number of carbon atoms within the range. Examples of commercial compounds of this chemistry are available on the market under the trade names Disponil or Agnique manufactured by BASF and Lipopeg™ manufactured by Lipo Chemicals, Inc.

In addition to ethoxylated carboxylic acids, commonly called polyethylene glycol esters, other alkanoic acid esters formed by reaction with glycerides, glycerin, and polyhydric (saccharide or sorbitan/sorbitol) alcohols have application in this invention for specialized embodiments, particularly indirect food additive applications. All of these ester moieties have one or more reactive hydrogen sites on their molecule which can undergo further acylation or ethylene oxide (alkoxide) addition to control the hydrophilicity of these substances. Care must be exercised when adding these fatty esters or acylated carbohydrates to compositions of the present invention containing amylase and/or lipase enzymes because of potential incompatibility.

Examples of nonionic low foaming surfactants include, but are not limited to, compounds which are modified, essentially reversed, by adding ethylene oxide to ethylene glycol to provide a hydrophile of designated molecular weight; and, then adding propylene oxide to obtain hydrophobic blocks on the outside (ends) of the molecule. The hydrophobic portion of the molecule weighs from about 1,000 to about 3,100 with the central hydrophile including 10% by weight to about 80% by weight of the final molecule. These reverse Pluronics™ are manufactured by BASF Corporation under the trade name Pluronic™ R surfactants. Likewise, the Tetronic™ R surfactants are produced by BASF Corporation by the sequential addition of ethylene oxide and propylene oxide to ethylenediamine. The hydrophobic portion of the molecule weighs from about 2,100 to about 6,700 with the central hydrophile including 10% by weight to 80% by weight of the final molecule.

Compounds which are modified by "capping" or "end blocking" the terminal hydroxy group or groups (of multifunctional moieties) to reduce foaming by reaction with a small hydrophobic molecule such as propylene oxide, butylene oxide, benzyl chloride; and, short chain fatty acids, alcohols or alkyl halides containing from 1 to about 5 carbon atoms; and mixtures thereof. Also included are reactants such as thionyl chloride which convert terminal hydroxy groups to a chloride group. Such modifications to the terminal hydroxy group may lead to all-block, block-heteric, heteric-block or all-heteric nonionics.

Additional examples of effective low foaming nonionic surfactants include, but are not limited to the alkylphenoxypolyethoxyalkanols of U.S. Pat. No. 2,903,486 issued Sep. 8, 1959 to Brown et al. and represented by the formula

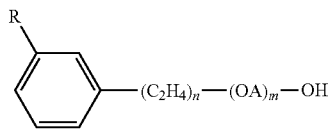

in which R is an alkyl group of 8 to 9 carbon atoms, A is an alkylene chain of 3 to 4 carbon atoms, n is an integer of 7 to 16, and m is an integer of 1 to 10.

The polyalkylene glycol condensates of U.S. Pat. No. 3,048,548 issued Aug. 7, 1962 to Martin et al. having alternated hydrophilic oxyethylene chains and hydrophobic oxypropylene chains where the weight of the terminal hydrophobic chains, the weight of the middle hydrophobic unit and the weight of the linking hydrophilic units each represent about one-third of the condensate.

The defoaming nonionic surfactants disclosed in U.S. Pat. No. 3,382,178 issued May 7, 1968 to Lissant et al. having the general formula $Z[(OR)_nOH]_z$ wherein Z is alkoxylatable material, R is a radical derived from an alkylene oxide which can be ethylene and propylene and n is an integer from, for example, 10 to 2,000 or more and z is an integer determined by the number of reactive oxyalkylatable groups.

The conjugated polyoxyalkylene compounds described in U.S. Pat. No. 2,677,700, issued May 4, 1954 to Jackson et al. corresponding to the formula $Y(C_3H_6O)_n (C_2H_4O)_mH$ wherein Y is the residue of organic compound having from about 1 to 6 carbon atoms and one reactive hydrogen atom, n has an average value of at least about 6.4, as determined by hydroxyl number and m has a value such that the oxyethylene portion constitutes about 10% to about 90% by weight of the molecule.

The conjugated polyoxyalkylene compounds described in U.S. Pat. No. 2,674,619, issued Apr. 6, 1954 to Lundsted et al. having the formula $Y[(C_3H_6O_n (C_2H_4O)_mH]_x$ wherein Y is the residue of an organic compound having from about 2 to 6 carbon atoms and containing x reactive hydrogen atoms in which x has a value of at least about 2, n has a value such that the molecular weight of the polyoxypropylene hydrophobic base is at least about 900 and m has value such that the oxyethylene content of the molecule is from about 10% to about 90% by weight. Compounds falling within the scope of the definition for Y include, for example, propylene glycol, glycerine, pentaerythritol, trimethylolpropane, ethylenediamine and the like. The oxypropylene chains optionally, but advantageously, contain small amounts of ethylene oxide and the oxyethylene chains also optionally, but advantageously, contain small amounts of propylene oxide.

Additional conjugated polyoxyalkylene surface-active agents which are advantageously used in the compositions of this invention correspond to the formula: $P[(C_3H_6O)_n (C_2H_4O)_mH]_x$ wherein P is the residue of an organic compound having from about 8 to 18 carbon atoms and containing x reactive hydrogen atoms in which x has a value of 1 or 2, n has a value such that the molecular weight of the polyoxyethylene portion is at least about 44 and m has a value such that the oxypropylene content of the molecule is from about 10% to about 90% by weight. In either case the oxypropylene chains may contain optionally, but advantageously, small amounts of ethylene oxide and the oxyethylene chains may contain also optionally, but advantageously, small amounts of propylene oxide.

Polyhydroxy fatty acid amide surfactants suitable for use in the present compositions include those having the structural formula $R_2CON_{R_1}Z$ in which: R1 is H, $C_1$-$C_4$ hydrocarbyl, 2-hydroxy ethyl, 2-hydroxy propyl, ethoxy, propoxy group, or a mixture thereof; R2 is a $C_5$-$C_{31}$ hydrocarbyl, which can be straight-chain; and Z is a polyhydroxyhydrocarbyl having a linear hydrocarbyl chain with at least 3 hydroxyls directly connected to the chain, or an alkoxylated derivative (preferably ethoxylated or propoxylated) thereof. Z can be derived from a reducing sugar in a reductive amination reaction; such as a glycityl moiety.

The alkyl ethoxylate condensation products of aliphatic alcohols with from about 0 to about 25 moles of ethylene oxide are suitable for use in the present compositions. The alkyl chain of the aliphatic alcohol can either be straight or branched, primary or secondary, and generally contains from 6 to 22 carbon atoms.

The ethoxylated $C_6$-$C_{18}$ fatty alcohols and $C_6$-$C_{18}$ mixed ethoxylated and propoxylated fatty alcohols are suitable surfactants for use in the present compositions, particularly those that are water soluble. Suitable ethoxylated fatty alcohols include the $C_6$-$C_{18}$ ethoxylated fatty alcohols with a degree of ethoxylation of from 3 to 50.

Suitable nonionic alkylpolysaccharide surfactants, particularly for use in the present compositions include those disclosed in U.S. Pat. No. 4,565,647, Llenado, issued Jan. 21, 1986. These surfactants include a hydrophobic group containing from about 6 to about 30 carbon atoms and a polysaccharide, e.g., a polyglycoside, hydrophilic group containing from about 1.3 to about 10 saccharide units. Any reducing saccharide containing 5 or 6 carbon atoms can be used, e.g., glucose, galactose and galactosyl moieties can be substituted for the glucosyl moieties. (Optionally the hydrophobic group is attached at the 2-, 3-, 4-, etc. positions thus giving a glucose or galactose as opposed to a glucoside or galactoside). The inter-saccharide bonds can be, e.g., between the one position of the additional saccharide units and the 2-, 3-, 4-, and/or 6-positions on the preceding saccharide units.

Fatty acid amide surfactants suitable for use the present compositions include those having the formula: $R6CON(R7)_2$ in which R6 is an alkyl group containing from 7 to 21 carbon atoms and each R7 is independently hydrogen, $C_1$-$C_4$ alkyl, $C_1$-$C_4$ hydroxyalkyl, or $-(C_2H_4O)_xH$, where x is in the range of from 1 to 3.

A useful class of non-ionic surfactants include the class defined as alkoxylated amines or, most particularly, alcohol alkoxylated/aminated/alkoxylated surfactants. These nonionic surfactants may be at least in part represented by the general formulae: $R^{20}-(PO)_SN-(EO)_tH$, $R^{20}-(PO)_SN-(EO)_tH(EO)_tH$, and $R^{20}-N(EO)_tH$; in which $R^{20}$ is an alkyl, alkenyl or other aliphatic group, or an alkyl-aryl group of from 8 to 20, preferably 12 to 14 carbon atoms, EO is oxyethylene, PO is oxypropylene, s is 1 to 20, preferably 2-5, t is 1-10, preferably 2-5, and u is 1-10, preferably 2-5. Other variations on the scope of these compounds may be represented by the alternative formula: $R^{20}-(PO)_V-N[(EO)_wH][(EO)_zH]$ in which $R^{20}$ is as defined above, v is 1 to 20 (e.g., 1, 2, 3, or 4 (preferably 2)), and w and z are independently 1-10, preferably 2-5. These compounds are represented commercially by a line of products sold by Huntsman Chemicals as nonionic surfactants. A preferred chemical of this class includes Surfonic™ PEA 25 Amine Alkoxylate. Preferred nonionic surfactants for the compositions of the invention include alcohol alkoxylates, EO/PO block copolymers, alkylphenol alkoxylates, and the like.

The treatise *Nonionic Surfactants*, edited by Schick, M. J., Vol. 1 of the Surfactant Science Series, Marcel Dekker, Inc., New York, 1983 is an excellent reference on the wide variety of nonionic compounds generally employed in the practice of the present invention. A typical listing of nonionic classes, and species of these surfactants, is given in U.S. Pat. No. 3,929,678 issued to Laughlin and Heuring on Dec. 30, 1975. Further examples are given in "Surface Active Agents and detergents" (Vol. I and II by Schwartz, Perry and Berch).

Suitable nonionic surfactants suitable for use with the compositions of the present invention include alkoxylated surfactants. Suitable alkoxylated surfactants include EO/PO copolymers, fully capped or partially EO/PO copolymers, alcohol alkoxylates, capped alcohol alkoxylates, mixtures thereof, or the like. Suitable alkoxylated surfactants for use as solvents include EO/PO block copolymers, such as the Pluronic and reverse Pluronic surfactants; alcohol alkoxylates, such as Dehypon LS-54 (R-(EO)$_5$(PO)$_4$) and Dehypon LS-36 (R-(EO)$_3$(PO)$_6$); and capped alcohol alkoxylates, such as Plurafac LF221 and Tegoten EC11; mixtures thereof, or the like.

In some embodiments that are not detergent compositions, the composition disclosed herein is free of a nonionic surfactant.

Semi-Polar Nonionic Surfactants

The semi-polar type of nonionic surfactants are another class of nonionic surfactants useful in compositions disclosed herein. Generally, semi-polar nonionic surfactants are high foaming agents and foam stabilizers, which can limit their application in CIP systems. However, in some embodiments designed for high foaming composition or detergent composition, semi-polar nonionic surfactants would have immediate utility. The semi-polar nonionic surfactants include, but are not limited to, the amine oxides, phosphine oxides, sulfoxides and their alkoxylated derivatives.

Amine oxides are tertiary amine oxides corresponding to the general formula:

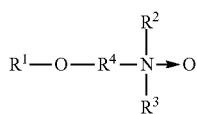

wherein the arrow is a conventional representation of a semi-polar bond; and, $R^1$, $R^2$, and $R^3$ may be aliphatic, aromatic, heterocyclic, alicyclic, or combinations thereof. Generally, for amine oxides of detergent interest, $R^1$ is an alkyl radical of from about 8 to about 24 carbon atoms; $R^2$ and $R^3$ are alkyl or hydroxyalkyl of 1-3 carbon atoms or a mixture thereof; $R^2$ and $R^3$ can be attached to each other, e.g. through an oxygen or nitrogen atom, to form a ring structure; $R^4$ is an alkylene or a hydroxyalkylene group containing 2 to 3 carbon atoms; and n ranges from 0 to about 20.

Useful water soluble amine oxide surfactants are selected from the coconut or tallow alkyl di-(lower alkyl) amine oxides, specific examples of which are dodecyldimethylamine oxide, tridecyldimethylamine oxide, etradecyldimethylamine oxide, pentadecyldimethylamine oxide, hexadecyldimethylamine oxide, heptadecyldimethylamine oxide, octadecyldimethylaine oxide, dodecyldipropylamine oxide, tetradecyldipropylamine oxide, hexadecyldipropylamine oxide, tetradecyldibutylamine oxide, octadecyldibutylamine oxide, bis(2-hydroxyethyl)dodecylamine oxide, bis(2-hydroxyethyl)-3-dodecoxy-1-hydroxypropylamine oxide, dimethyl-(2-hydroxydodecyl)amine oxide, 3,6,9-trioctadecyldimethylamine oxide and 3-dodecoxy-2-hydroxypropyldi-(2-hydroxyethyl)amine oxide.

Useful semi-polar nonionic surfactants also include the water-soluble phosphine oxides having the following structure:

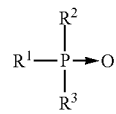

wherein the arrow is a conventional representation of a semi-polar bond; and, $R^1$ is an alkyl, alkenyl or hydroxyalkyl moiety ranging from 10 to about 24 carbon atoms in chain length; and, $R^2$ and $R^3$ are each alkyl moieties separately selected from alkyl or hydroxyalkyl groups containing 1 to 3 carbon atoms.

Examples of useful phosphine oxides include dimethyldecylphosphine oxide, dimethyltetradecylphosphine oxide, methylethyltetradecylphosphone oxide, dimethylhexadecylphosphine oxide, diethyl-2-hydroxyoctyldecylphosphine oxide, bis(2-hydroxyethyl)dodecylphosphine oxide, and bis(hydroxymethyl)tetradecylphosphine oxide.

Semi-polar nonionic surfactants useful herein also include the water soluble sulfoxide compounds which have the structure:

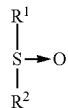

wherein the arrow is a conventional representation of a semi-polar bond; and, $R^1$ is an alkyl or hydroxyalkyl moiety of about 8 to about 28 carbon atoms, from 0 to about 5 ether linkages and from 0 to about 2 hydroxyl substituents; and $R^2$ is an alkyl moiety consisting of alkyl and hydroxyalkyl groups having 1 to 3 carbon atoms.

Useful examples of these sulfoxides include dodecyl methyl sulfoxide; 3-hydroxy tridecyl methyl sulfoxide; 3-methoxy tridecyl methyl sulfoxide; and 3-hydroxy-4-dodecoxybutyl methyl sulfoxide.

Semi-polar nonionic surfactants for the compositions of the invention include dimethyl amine oxides, such as lauryl dimethyl amine oxide, myristyl dimethyl amine oxide, cetyl dimethyl amine oxide, combinations thereof, and the like. Useful water soluble amine oxide surfactants are selected from the octyl, decyl, dodecyl, isododecyl, coconut, or tallow alkyl di-(lower alkyl) amine oxides, specific examples of which are octyldimethylamine oxide, nonyldimethylamine oxide, decyldimethylamine oxide, undecyldimethylamine oxide, dodecyldimethylamine oxide, iso-dodecyldimethyl amine oxide, tridecyldimethylamine oxide, tetradecyldimethylamine oxide, pentadecyldimethylamine oxide, hexadecyldimethylamine oxide, heptadecyldimethylamine oxide, octadecyldimethylaine oxide, dodecyldipropylamine oxide, tetradecyldipropylamine oxide, hexadecyldipropylamine oxide, tetradecyldibutylamine oxide, octadecyldibutylamine oxide, bis(2-hydroxyethyl)dodecylamine oxide, bis(2-hydroxyethyl)-3-dodecoxy-1-hydroxypropylamine oxide, dimethyl-(2-hydroxydodecyl)

amine oxide, 3,6,9-trioctadecyldimethylamine oxide and 3-dodecoxy-2-hydroxypropyldi-(2-hydroxyethyl)amine oxide.

In some embodiments, the composition or detergent composition disclosed herein is free of a semi-polar nonionic surfactant.

Cationic Surfactants

Surface active substances are classified as cationic if the charge on the hydrotrope portion of the molecule is positive. Surfactants in which the hydrotrope carries no charge unless the pH is lowered close to neutrality or lower, but which are then cationic (e.g. alkyl amines), are also included in this group. In theory, cationic surfactants may be synthesized from any combination of elements containing an "onium" structure RnX+Y— and could include compounds other than nitrogen (ammonium) such as phosphorus (phosphonium) and sulfur (sulfonium). In practice, the cationic surfactant field is dominated by nitrogen containing compounds, probably because synthetic routes to nitrogenous cationics are simple and straightforward and give high yields of product, which can make them less expensive.

Cationic surfactants preferably include, more preferably refer to, compounds containing at least one long carbon chain hydrophobic group and at least one positively charged nitrogen. The long carbon chain group may be attached directly to the nitrogen atom by simple substitution; or more preferably indirectly by a bridging functional group or groups in so-called interrupted alkylamines and amido amines. Such functional groups can make the molecule more hydrophilic and/or more water dispersible, more easily water solubilized by co-surfactant mixtures, and/or water soluble. For increased water solubility, additional primary, secondary or tertiary amino groups can be introduced, or the amino nitrogen can be quaternized with low molecular weight alkyl groups. Further, the nitrogen can be a part of branched or straight chain moiety of varying degrees of unsaturation or of a saturated or unsaturated heterocyclic ring. In addition, cationic surfactants may contain complex linkages having more than one cationic nitrogen atom.

The surfactant compounds classified as amine oxides, amphoterics and zwitterions are themselves typically cationic in near neutral to acidic pH solutions and can overlap surfactant classifications. Polyoxyethylated cationic surfactants generally behave like nonionic surfactants in alkaline solution and like cationic surfactants in acidic solution.

The simplest cationic amines, amine salts and quaternary ammonium compounds can be schematically drawn thus:

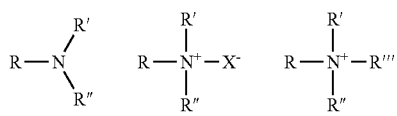

in which, R represents an alkyl chain, R', R'', and R''' may be either alkyl chains or aryl groups or hydrogen and X represents an anion. The amine salts and quaternary ammonium compounds are preferred for practical use in this invention due to their high degree of water solubility.

Most large volume commercial cationic surfactants can be subdivided into four major classes and additional sub-groups known to those skilled in the art and described in "Surfactant Encyclopedia", *Cosmetics & Toiletries*, Vol. 104 (2) 86-96 (1989). The first class includes alkylamines and their salts. The second class includes alkyl imidazolines. The third class includes ethoxylated amines. The fourth class includes quaternaries, such as alkylbenzyldimethylammonium salts, alkyl benzene salts, heterocyclic ammonium salts, tetra alkylammonium salts, and the like. Cationic surfactants are known to have a variety of properties that can be beneficial in the present compositions. These desirable properties can include detergency in compositions of or below neutral pH, antimicrobial efficacy, thickening or gelling in cooperation with other agents, and the like.

Cationic surfactants useful in the compositions disclosed herein include those having the formula $R^1{}_m R^2{}_x Y_L Z$ wherein each $R^1$ is an organic group containing a straight or branched alkyl or alkenyl group optionally substituted with up to three phenyl or hydroxy groups and optionally interrupted by up to four of the following structures:

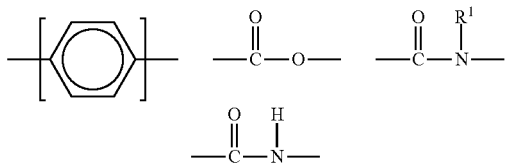

or an isomer or mixture of these structures, and which contains from about 8 to 22 carbon atoms. The $R^1$ groups can additionally contain up to 12 ethoxy groups. m is a number from 1 to 3. Preferably, no more than one $R^1$ group in a molecule has 16 or more carbon atoms when m is 2 or more than 12 carbon atoms when m is 3. Each $R^2$ is an alkyl or hydroxyalkyl group containing from 1 to 4 carbon atoms or a benzyl group with no more than one $R^2$ in a molecule being benzyl, and x is a number from 0 to 11, preferably from 0 to 6. The remainder of any carbon atom positions on the Y group are filled by hydrogens.

Y is can be a group including, but not limited to:

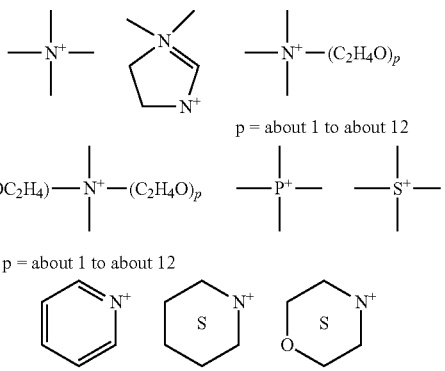

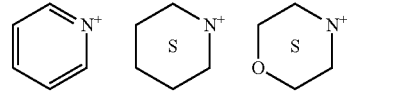

or a mixture thereof. Preferably, L is 1 or 2, with the Y groups being separated by a moiety selected from $R^1$ and $R^2$ analogs (preferably alkylene or alkenylene) having from 1 to about 22 carbon atoms and two free carbon single bonds when L is 2. Z is a water-soluble anion, such as a halide, sulfate, methylsulfate, hydroxide, or nitrate anion, particularly preferred being chloride, bromide, iodide, sulfate or methyl sulfate anions, in a number to give electrical neutrality of the cationic component.

In some embodiments, the composition or detergent composition disclosed herein is free of a cationic surfactant.

Amphoteric Surfactants

Amphoteric, or ampholytic, surfactants contain both a basic and an acidic hydrophilic group and an organic hydrophobic group. These ionic entities may be any of anionic or cationic groups described herein for other types of surfactants. A basic nitrogen and an acidic carboxylate group are the typical functional groups employed as the basic and acidic hydrophilic groups. In a few surfactants, sulfonate, sulfate, phosphonate or phosphate provide the negative charge.

Amphoteric surfactants can be broadly described as derivatives of aliphatic secondary and tertiary amines, in which the aliphatic radical may be straight chain or branched and wherein one of the aliphatic substituents contains from about 8 to 18 carbon atoms and one contains an anionic water solubilizing group, e.g., carboxy, sulfo, sulfato, phosphato, or phosphono. Amphoteric surfactants are subdivided into two major classes known to those of skill in the art and described in "Surfactant Encyclopedia" *Cosmetics & Toiletries*, Vol. 104 (2) 69-71 (1989), which is herein incorporated by reference in its entirety. The first class includes acyl/dialkyl ethylenediamine derivatives (e.g. 2-alkyl hydroxyethyl imidazoline derivatives) and their salts. The second class includes N-alkylamino acids and their salts. Some amphoteric surfactants can be envisioned as fitting into both classes.

Amphoteric surfactants can be synthesized by methods known to those of skill in the art. For example, 2-alkyl hydroxyethyl imidazoline is synthesized by condensation and ring closure of a long chain carboxylic acid (or a derivative) with dialkyl ethylenediamine. Commercial amphoteric surfactants are derivatized by subsequent hydrolysis and ring-opening of the imidazoline ring by alkylation—for example with chloroacetic acid or ethyl acetate. During alkylation, one or two carboxy-alkyl groups react to form a tertiary amine and an ether linkage with differing alkylating agents yielding different tertiary amines.

Long chain imidazole derivatives having application in the present invention generally have the general formula:

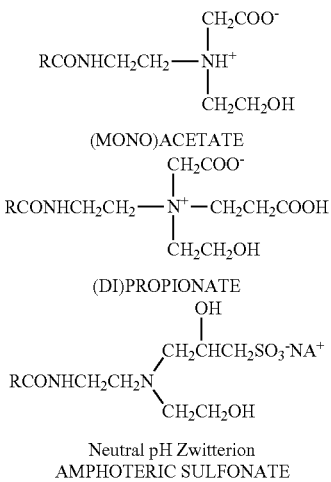

wherein R is an acyclic hydrophobic group containing from about 8 to 18 carbon atoms and M is a cation to neutralize the charge of the anion, generally sodium. Commercially prominent imidazoline-derived amphoterics that can be employed in the present compositions include for example: Cocoamphopropionate, Cocoamphocarboxy-propionate, Cocoamphoglycinate, Cocoamphocarboxy-glycinate, Cocoamphopropyl-sulfonate, and Cocoamphocarboxy-propionic acid. Amphocarboxylic acids can be produced from fatty imidazolines in which the dicarboxylic acid functionality of the amphodicarboxylic acid is diacetic acid and/or dipropionic acid.

The carboxymethylated compounds (glycinates) described herein above frequently are called betaines. Betaines are a special class of amphoteric discussed herein below in the section entitled, Zwitterion Surfactants.

Long chain N-alkylamino acids are readily prepared by reaction $RNH_2$, in which $R=C_8$-$C_{18}$ straight or branched chain alkyl, fatty amines with halogenated carboxylic acids. Alkylation of the primary amino groups of an amino acid leads to secondary and tertiary amines. Alkyl substituents may have additional amino groups that provide more than one reactive nitrogen center. Most commercial N-alkylamine acids are alkyl derivatives of beta-alanine or beta-N(2-carboxyethyl) alanine. Examples of commercial N-alkylamino acid ampholytes having application in this invention include alkyl beta-amino dipropionates, $RN(C_2H_4COOM)_2$ and $RNHC_2H_4COOM$. In an embodiment, R can be an acyclic hydrophobic group containing from about 8 to about 18 carbon atoms, and M is a cation to neutralize the charge of the anion.

Suitable amphoteric surfactants include those derived from coconut products such as coconut oil or coconut fatty acid. Additional suitable coconut derived surfactants include as part of their structure an ethylenediamine moiety, an alkanolamide moiety, an amino acid moiety, e.g., glycine, or a combination thereof; and an aliphatic substituent of from about 8 to 18 (e.g., 12) carbon atoms. Such a surfactant can also be considered an alkyl amphodicarboxylic acid. These amphoteric surfactants can include chemical structures represented as: $C_{12}$-alkyl-C(O)—NH—$CH_2$—$CH_2$—$N^+$($CH_2$—$CH_2$—$CO_2Na)_2$—$CH_2$—$CH_2$—OH or $C_{12}$-alkyl-C(O)—N(H)—$CH_2$—$CH_2$—$N^+$($CH_2$—$CO_2Na)_2$—$CH_2$—$CH_2$—OH. Disodium cocoampho dipropionate is one suitable amphoteric surfactant and is commercially available under the tradename Miranol™ FBS from Rhodia Inc., Cranbury, N.J. Another suitable coconut derived amphoteric surfactant with the chemical name disodium cocoampho diacetate is sold under the tradename Mirataine™ JCHA, also from Rhodia Inc., Cranbury, N.J.

A typical listing of amphoteric classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch). Each of these references are herein incorporated by reference in their entirety.

In some embodiments, the composition or detergent composition disclosed herein is free of an amphoteric surfactant.

Zwitterionic Surfactants

Zwitterionic surfactants can be thought of as a subset of the amphoteric surfactants and can include an anionic charge. Zwitterionic surfactants can be broadly described as derivatives of secondary and tertiary amines, derivatives of heterocyclic secondary and tertiary amines, or derivatives of quaternary ammonium, quaternary phosphonium or tertiary sulfonium compounds. Typically, a zwitterionic surfactant includes a positive charged quaternary ammonium or, in some cases, a sulfonium or phosphonium ion; a negative charged carboxyl group; and an alkyl group. Zwitterionic surfactants generally contain cationic and anionic groups which ionize to a nearly equal degree in the isoelectric region of the molecule and which can develop strong "inner-salt" attraction between positive-negative charge centers. Examples of such zwitterionic synthetic surfactants include derivatives of aliphatic quaternary ammonium, phosphonium, and sulfonium compounds, in which the aliphatic radicals can be straight chain or branched, and wherein one of the aliphatic substituents contains from 8 to 18 carbon atoms and one contains an anionic water solubilizing group, e.g., carboxy, sulfonate, sulfate, phosphate, or phosphonate.

Betaine and sultaine surfactants are exemplary zwitterionic surfactants for use herein. A general formula for these compounds is:

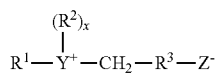

wherein $R^1$ contains an alkyl, alkenyl, or hydroxyalkyl radical of from 8 to 18 carbon atoms having from 0 to 10 ethylene oxide moieties and from 0 to 1 glyceryl moiety; Y is selected from the group consisting of nitrogen, phosphorus, and sulfur atoms; $R^2$ is an alkyl or monohydroxy alkyl group containing 1 to 3 carbon atoms; x is 1 when Y is a sulfur atom and 2 when Y is a nitrogen or phosphorus atom, $R^3$ is an alkylene or hydroxy alkylene or hydroxy alkylene of from 1 to 4 carbon atoms and Z is a radical selected from the group consisting of carboxylate, sulfonate, sulfate, phosphonate, and phosphate groups.

Examples of zwitterionic surfactants having the structures listed above include: 4-[N,N-di(2-hydroxyethyl)-N-octadecylammonio]-butane-1-carboxylate; 5-[S-3-hydroxypropyl-S-hexadecylsulfonio]-3-hydroxypentane-1-sulfate; 3-[P,P-diethyl-P-3,6,9-trioxatetracosanephosphonio]-2-hydroxypropane-1-phosphate; 3-[N,N-dipropyl-N-3-dodecoxy-2-hydroxypropyl-ammonio]-propane-1-phosphonate; 3-(N,N-dimethyl-N-hexadecylammonio)-propane-1-sulfonate; 3-(N,N-dimethyl-N-hexadecylammonio)-2-hydroxy-propane-1-sulfonate; 4-[N,N-di(2-hydroxyethyl)-N(2-hydroxydodecyl)ammonio]-butane-1-carboxylate; 3-[S-ethyl-S-(3-dodecoxy-2-hydroxypropyl)sulfonio]-propane-1-phosphate; 3-[P,P-dimethyl-P-dodecylphosphonio]-propane-1-phosphonate; and S[N,N-di(3-hydroxypropyl)-N-hexadecylammonio]-2-hydroxy-pentane-1-sulfate. The alkyl groups contained in said detergent surfactants can be straight or branched and saturated or unsaturated.

The zwitterionic surfactant suitable for use in the present compositions includes a betaine of the general structure:

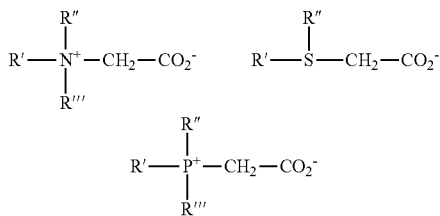

These surfactant betaines typically do not exhibit strong cationic or anionic characters at pH extremes nor do they show reduced water solubility in their isoelectric range. Unlike "external" quaternary ammonium salts, betaines are compatible with anionics. Examples of suitable betaines include coconut acylamidopropyldimethyl betaine; hexadecyl dimethyl betaine; $C_{12-14}$ acylamidopropylbetaine; $C_{8-14}$ acylamidohexyldiethyl betaine; 4-$C_{14-16}$ acylmethylamidodiethylammonio-1-carboxybutane; $C_{16-18}$ acylamidodimethylbetaine; C12-16 acylamidopentanediethylbetaine; and $C_{12-16}$ acylmethylamidodimethylbetaine.

Sultaines useful in the present invention include those compounds having the formula $(R(R^1)_2 N^+ R^2SO^{3-}$, in which R is a $C_6$—$C_{18}$ hydrocarbyl group, each $R^1$ is typically independently $C_1$-$C_3$ alkyl, e.g., methyl, and $R^2$ is a $C_1$-$C_6$ hydrocarbyl group, e.g., a $C_1$-$C_3$ alkylene or hydroxyalkylene group.

A typical listing of zwitterionic classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch). Each of these references are herein incorporated in their entirety.

In some embodiments, the composition or detergent composition disclosed herein is free of a zwitterionic surfactant.

Gemini Surfactants

While conventional surfactants generally have one hydrophilic group and one hydrophobic group, a Gemini surfactant has at least two hydrophobic groups and at least two hydrophilic groups. These surfactants have the general formula: A1-G-A2 and get their name because they comprise two surfactant moieties (Al1-A2) joined by a spacer (G), wherein each surfactant moiety (A1, A2) has a hydrophilic group and a hydrophobic group. Generally, the two surfactant moieties (A1, A2) are the same, but they can be different.

The Gemini surfactants may be anionic, nonionic, cationic or amphoteric. The hydrophilic and hydrophobic groups of each surfactant moiety (A1, A2) may be any of those known to be used in conventional surfactants having one hydrophilic group and one hydrophobic group. For example, a typical nonionic Gemini surfactant, e.g., a bis-polyoxyethylene alkyl ether, would contain two polyoxyethylene alkyl ether moieties. Each moiety would contain a hydrophilic group, e.g., polyethylene oxide, and a hydrophobic group, e.g., an alkyl chain.

Anionic and nonionic Gemini surfactants include those of the formula:

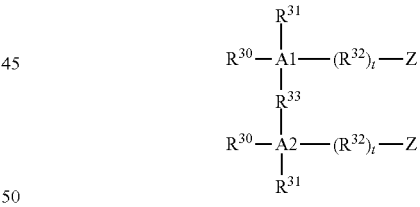

wherein $R^{30}$ is independently $C_1$ to $C_{22}$ alkyl, $R^{14}$—C(O)—, or $R^{34}$—B–$R^{35}$—, wherein $R^{34}$ is $C_1$ to $C_{22}$ alkyl, $R^{35}$ is $C_1$ to $C_{12}$ alkyl, and B is an amide group, —C(O)N($R^{36}$)—, an amino group —N($R^{36}$)—, a carboxyl group —C(O)—O—, a carbonyl group, or a polyether group -(EO)$_a$ (PO)$_b$—, wherein EO represents ethyleneoxy radicals, PO represents propyleneoxy radicals, a and b are numbers of from 0 to 100, a is preferably from about 0 to about 30 and b is preferably from about 0 to 10, wherein a plus b is at least one, and the EO and PO radicals can be randomly mixed or in discrete blocks, and $R^{36}$ is hydrogen or $C_1$ to $C_6$ alkyl.

$R^{31}$ is independently hydrogen or $C_1$ to $C_{22}$ alkyl; $R^{32}$ is independently a $C_{14}$-$C_{10}$ alkyl, —O—, an amide group —C(O)N($R_6$)—, a polyether group —O(EO)$_a$ (PO)$_b$—, —$R^{37}$-D-$R^{37}$—, or -D-$R^{37}$-D-, wherein $R^{37}$ is independently a $C_1$-$C_6$ alkyl and D is —O—, —S—, an amide group —C(O)N($R^{36}$)—, or an amino group —N($R^{36}$)—, wherein $R^{36}$, a and b are as defined above, and t is independently 0 or 1.

Z is independently hydrogen, —$SO_3Y$, —P(O)(OY)$_2$, —COOY, —$CH_2$COOY, —$CH_2$CH(OF)$CH_2SO_3Y$ and when $R^{32}$ is not a polyether, Z is also —$OSO_3Y$, and —OP(O)(OY)$_2$; wherein Y is hydrogen, alkali metal such as sodium and potassium; alkaline earth metal such as magnesium and calcium; ammonium; or organic base salt such as monoethanolamine, diethanolamine, triethanolamine, triethylamine, trimethylamine, N-hydroxyethyl morpholine, and the like.

A1 or A2 is independently a straight chain or branched $C_1$ to $C_6$ alkyl, an O—$R_5$O— group or aryl: preferably phenyl; $R^{33}$ is a bond, an aryl group such as a phenyl or diphenyl group, a $C_1$ to $C_{10}$ alkyl group, preferably a $C_1$ to $C_4$ alkyl group, most preferably methylene, —C≡C—, —O—, —S—, —S—S—, —N($R^{36}$)—, —$R^{35}$O—, —$R^{35}$O(EO)$_a$(PO)$_b$—, -$D_1$-$R^3$-$D_1$- or —$R^3$-$D_1$-$R^{38}$—, wherein $R^{38}$ is independently a $C_1$—$C_{10}$ alkyl group, —C(O)—$R^{35}$O(EO)$_a$(PO)$_b$—, —O—$R^{35}$—O—, or aryl, e.g. phenyl, and $D_1$ is independently —O—, —S—, —S—S—, —$SO_2$—, —C(O)—, a polyether group —O(EO)$_a$(PO)$_b$—, an amide group —C(O)N($R^{36}$)—, an amino group —N($R^{36}$)—, —O—$R_5$—O—, or aryl wherein $R^{35}$, $R^{36}$, a and b are as defined above.

On the formulae of this disclosure, the term "alkali" includes substituted alkali, especially the hydroxy substituted derivatives thereof and straight as well as branched chains. When Z is hydrogen, the gemini surfactants are nonionic.

Other Gemini surfactants specifically useful in the present disclosure include gemini anionic or nonionic surfactants of the formulae:

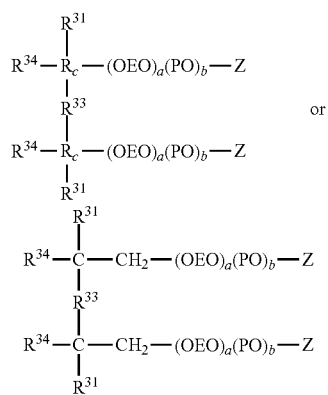

wherein ti represents aryl, preferably phenyl. $R^{31}$, $R^{33}$, $R^{34}$, and Z are as defined above, a and b are numbers of from 0 to 100, a is preferably from about 0 to about 30 and b is preferably from about 0 to 10, wherein a plus b is at least one, and the EO and PO radicals can be randomly mixed or in discrete blocks.

The primary hydroxyl group of these surfactants can be readily phosphated, sulfated or carboxylated by standard techniques.

In some embodiments, the composition or detergent composition disclosed herein is free of a Gemini surfactant.

TABLE 2

Exemplary Corrosion control compositions

| Material | First Exemplary Range wt-% | Second Exemplary Range wt-% | Third Exemplary Range wt-% | Fourth Exemplary Range wt-% |
|---|---|---|---|---|
| Primary alkalinity source | 20-80 | 30-75 | 40-75 | 50-75 |
| Cationic Alkyl Polyglycosides | 10-20 | 10-20 | 10-15 | 5-20 |
| Chelant | 0.1-25 | 1-20 | 1-15 | 1-10 |
| Defoaming agent | 0.1-25 | 1-20 | 1-10 | 1-5 |
| Additional Functional Ingredients | 0-25 | 0-20 | 0-10 | 0-5 |

Water System

As water system as used in this disclosure includes both water and surfaces that have contact with the water. In some embodiments, the water system in the disclosed methods herein is an industrial water system. In other embodiments, the water system can be, but is not limited to, a cooling water system, including an open recirculating system, closed and once-through cooling water system, boilers and boiler water system, petroleum well system, downhole formation, geothermal well, and other water system in oil and gas field applications, a mineral washing system, flotation and benefaction system, paper mill digester, washer, bleach plant, stock chest, white water system, paper machine surface, black liquor evaporator in the pulp industry, gas scrubber and air washer, continuous casting processes in the metallurgical industry, air conditioning and refrigeration system, industrial and petroleum process water, indirect contact cooling and heating water, water reclamation system, water purification system, membrane filtration water system, food processing stream (meat, vegetable, sugar beets, sugar cane, grain, poultry, fruit and soybean), waste treatment system, clarifier, liquid-solid application, municipal sewage treatment, municipal water system, potable water system, aquifer, water tank, sprinkler system, or water heater.

In some embodiments, the water system is a cooling water system, including open recirculating, closed and once-through cooling water system, paper machine surface, food processing stream, waste treatment system, or potable water system.

In some embodiments, the water system is any system including a wetable surface, particularly a wetable metal surface. Examples of surfaces in such water systems include, but are not limited to, walls and floors of bath rooms or surfaces of pipes or containers. Surfaces or metal surfaces are typically in constant contact with water or water moisture and subjected to biofilm growth or corrosion.

In some embodiments, the water system comprises a metal surface. In some other embodiments, the water system comprises a surface that is made of steel or other metal or comprises steel or other metals that can be corrosive.

Use of the Methods or Compositions Disclosed

In some embodiments, for the methods disclosed herein, providing a corrosion control composition into a water system means that the corrosion control composition or cationic alkyl polyglycosides are added into a fluid comprising water or onto surfaces of a water system. In other embodiments, providing a corrosion control composition into a water system means adding the corrosion control composition or cationic alkyl polyglycosides to the surface or water of the water system. In some other embodiments, providing a corrosion control composition into a water system means adding the corrosion control composition or cationic alkyl polyglycosides to a fluid or gas which contacts the surfaces of the water system. The corrosion control composition or cationic alkyl polyglycosides may be added continuously, or intermittently when more compounds or compositions may be needed.

In some embodiments, the corrosion control composition or cationic alkyl polyglycosides may be added to the water of the water system in an amount ranging from about 1 ppm to about 1000 ppm. In other embodiments, the amount of the corrosion control composition or cationic alkyl polyglycosides in the water of the water system may range from about 5 ppm to about 100 ppm, from about 5 ppm to about 50 ppm, from about 5 ppm to about 40 ppm, from about 5 ppm to about 30 ppm, from about 10 ppm to about 60 ppm, from about 10 ppm to about 50 ppm, from about 10 ppm to about 40 ppm, from about 10 ppm to about 30 ppm, from about 20 ppm to about 60 ppm, from about 20 ppm to about 50 ppm, from about 20 ppm to about 40 ppm, or from about 20 ppm to about 30 ppm. In some embodiments, the corrosion control composition or cationic alkyl polyglycosides may be added to the water to an amount ranging from about 100 ppm to about 1000 ppm, from about 125 ppm to about 1000 ppm, from about 250 ppm to about 1000 ppm, or from about 500 ppm to about 1000 ppm in the treated water system.

The corrosion control composition or cationic alkyl polyglycosides can be used for corrosion control in oil and gas applications such as by treating a gas or liquid stream with an effective amount of the compound or composition as described herein. The compounds and compositions can be used in any industry where it is desirable to prevent microbial or biofilm growth at a surface.

The corrosion control composition or cationic alkyl polyglycosides can be used in a condensate/oil systems/gas system, or any combination thereof. For example, the corrosion control composition or cationic alkyl polyglycosides can be used in corrosion control on heat exchanger surfaces. The corrosion control composition or cationic alkyl polyglycosides can be applied to a gas or liquid produced, or used in the production, transportation, storage, and/or separation of crude oil or natural gas. The corrosion control composition or cationic alkyl polyglycosides can be applied to a gas stream used or produced in a coal-fired process, such as a coal-fired power plant.

The corrosion control composition or cationic alkyl polyglycosides can be applied to a gas or liquid produced or used in a waste-water process, a farm, a slaughter house, a land-fill, a municipality waste-water plant, a coking coal process, or a biofuel process.

A fluid to which the corrosion control composition or cationic alkyl polyglycosides can be introduced can be an aqueous medium. The aqueous medium can comprise water, gas, and optionally liquid hydrocarbon.

A fluid to which the corrosion control composition or cationic alkyl polyglycosides can be introduced can be a liquid hydrocarbon. The liquid hydrocarbon can be any type of liquid hydrocarbon including, but not limited to, crude oil, heavy oil, processed residual oil, bituminous oil, coker oils, coker gas oils, fluid catalytic cracker feeds, gas oil, naphtha, fluid catalytic cracking slurry, diesel fuel, fuel oil, jet fuel, gasoline, and kerosene. The fluid or gas can be a refined hydrocarbon product.

A fluid or gas treated with the corrosion control composition or cationic alkyl polyglycosides can be at any selected temperature, such as ambient temperature or an elevated temperature. The fluid (e.g., liquid hydrocarbon) or gas can be at a temperature of from about 40° C. to about 250° C. The fluid or gas can be at a temperature of from about 40° C. to about 250° C. The fluid or gas can be at a temperature of from about −50° C. to about 300° C., from about 0° C. to about 200° C., from about 10° C. to about 100° C., or from about 20° C. to about 90° C. The fluid or gas can be at a temperature of about 22° C., about 23° C., about 24° C., about 25° C., about 26° C., about 27° C., about 28° C., about 29° C., about 30° C., about 31° C., about 32° C., about 33° C., about 34° C., about 35° C., about 36° C., about 37° C., about 38° C., about 39° C., or about 40° C. The fluid or gas can be at a temperature of about 85° C., about 86° C., about 87° C., about 88° C., about 89° C., about 90° C., about 91° C., about 92° C., about 93° C., about 94° C., about 95° C., about 96° C., about 97° C., about 98° C., about 99° C., or about 100° C.

The corrosion control composition or cationic alkyl polyglycosides can be added to a fluid at various levels of water cut. For example, the water cut can be from 0% to 100% volume/volume (v/v), from 1% to 80% v/v, or from 1% to 60% v/v. The fluid can be an aqueous medium that contains various levels of salinity. The fluid can have a salinity of 0% to 25%, about 1% to 24%, or about 10% to 25% weight/weight (w/w) total dissolved solids (TDS).

The fluid or gas in which the corrosion control composition or cationic alkyl polyglycosides are introduced can be contained in and/or exposed to many different types of apparatuses. For example, the fluid or gas can be contained in an apparatus that transports fluid or gas from one point to another, such as an oil and/or gas pipeline. The apparatus can be part of an oil and/or gas refinery, such as a pipeline, a separation vessel, a dehydration unit, or a gas line. The fluid can be contained in and/or exposed to an apparatus used in oil extraction and/or production, such as a wellhead. The apparatus can be part of a coal-fired power plant. The apparatus can be a scrubber (e.g., a wet flue gas desulfurizer, a spray dry absorber, a dry sorbent injector, a spray tower, a contact or bubble tower, or the like). The apparatus can be a cargo vessel, a storage vessel, a holding tank, or a pipeline connecting the tanks, vessels, or processing units.

The corrosion control composition or cationic alkyl polyglycosides can be introduced into a fluid or gas of the water system by any appropriate method for ensuring dispersal through the fluid or gas. For examples, the corrosion control composition or cationic alkyl polyglycosides can be added to the hydrocarbon fluid before the hydrocarbon fluid contacts the surface.

The corrosion control composition or cationic alkyl polyglycosides can be added at a point in a flow line upstream from the point at which corrosion control is desired. The corrosion control composition or cationic alkyl polyglycosides can be injected using mechanical equipment such as chemical injection pumps, piping tees, injection fittings, atomizers, quills, and the like.

The corrosion control composition or cationic alkyl polyglycosides can be pumped into an oil and/or gas pipeline using an umbilical line. A capillary injection system can be used to deliver the corrosion control composition or cationic alkyl polyglycosides to a selected fluid.

A fluid to which the corrosion control composition or cationic alkyl polyglycosides can be introduced can be an aqueous medium. The aqueous medium can comprise water, gas, and optionally liquid hydrocarbon. A fluid to the corrosion control composition or cationic alkyl polyglycosides can be introduced can be a liquid hydrocarbon.

The corrosion control composition or cationic alkyl polyglycosides can be introduced into a liquid and a mixture of several liquids, a liquid and gas, liquid, solid, and gas. The corrosion control composition or cationic alkyl polyglycosides can be injected into a gas stream as an aqueous or non-aqueous solution, mixture, or slurry.

The fluid or gas can be passed through an absorption tower comprising the corrosion control composition or cationic alkyl polyglycosides.

The corrosion control composition or cationic alkyl polyglycosides can be applied to a fluid or gas to provide any selected concentration. In practice, the corrosion control composition or cationic alkyl polyglycosides are typically added to a flow line to provide an effective treating dose of the corrosion control composition or cationic alkyl polyglycosides from about 0.01 to about 5,000 ppm. The corrosion control composition or cationic alkyl polyglycosides can be applied to a fluid or gas to provide an active concentration of about 1 part per million (ppm) to about 1,000,000 ppm, about 1 part per million (ppm) to about 100,000 ppm, or from about 10 ppm to about 75,000 ppm. The cationic alkyl polyglycoside/compositions can be applied to a fluid to provide an actives concentration of from about 100 ppm to about 10,000 ppm, from about 200 ppm to about 8,000 ppm, or from about 500 ppm to about 6,000 ppm. The actives concentration means the concentration of corrosion control composition or cationic alkyl polyglycosides.

The corrosion control composition or cationic alkyl polyglycosides can be applied to a fluid or gas to provide an active concentration of about 0.1 ppm, about 0.5 ppm, about 1 ppm, about 2 ppm, about 5 ppm, about 10 ppm, about 20 ppm, about 100 ppm, about 200 ppm, about 500 ppm, or about 1,000 ppm. The polymer salts/compositions can be applied to a fluid or gas to provide an actives concentration of about 0.125 ppm, about 0.25 ppm, about 0.625 ppm, about 1 ppm, about 1.25 ppm, about 2.5 ppm, about 5 ppm, about 10 ppm, or about 20 ppm in the treated fluid, gas, or water system. Each water system can have its own dose level requirements, and the effective dose level of the corrosion control composition or cationic alkyl polyglycosides to sufficiently reduce the rate of microbial or biofilm growth can vary with the water system in which it is used.

The corrosion control composition or cationic alkyl polyglycosides can be applied continuously, in batch, or a combination thereof. The corrosion control composition or cationic alkyl polyglycosides dosing can be continuous. The corrosion control composition or cationic alkyl polyglycosides dosing can be intermittent (e.g., batch treatment) or can be continuous/maintained and/or intermittent.

Dosage rates for continuous treatments typically range from about 10 to about 500 ppm, or from about 10 ppm to about 200 ppm. Dosage rates for batch treatments typically range from about 10 ppm to about 400,000 ppm, or from about 10 ppm to about 20,000 ppm. The corrosion control composition or cationic alkyl polyglycosides can be applied as a pill to a pipeline, providing a high dose (e.g., 20,000 ppm) of the composition.

The flow rate of a flow line in which the corrosion control composition or cationic alkyl polyglycosides is used can be between about 0.1 feet per second and about 100 feet per second, or between about 0.1 feet per second and about 50 feet per second. The corrosion control composition or cationic alkyl polyglycosides can also be formulated with water to facilitate addition to the flow line.

The surface can be a part of a wellbore or equipment used in the production, transportation, storage, and/or separation of a fluid such as crude oil or natural gas.

More specifically, the surface can be a part of equipment used a coal-fired process, a waste-water process, a farm, a slaughter house, a land-fill, a municipality waste-water plant, a coking coal process, or a biofuel process. Preferably, the surface can be a part of equipment used in the production of crude oil or natural gas.

The equipment can comprise a pipeline, a storage vessel, downhole injection tubing, a flow line, or an injection line.

The corrosion control composition or cationic alkyl polyglycosides are useful for corrosion inhibition of containers, processing facilities, or equipment in the food service or food processing industries. The corrosion control composition or cationic alkyl polyglycosides have particular value for use on food packaging materials and equipment, and especially for cold or hot aseptic packaging. Examples of process facilities in which the corrosion control composition or cationic alkyl polyglycosides can be employed include a milk line dairy, a continuous brewing system, food processing lines such as pumpable food systems and beverage lines, ware wash machines, low temperature ware wash machines, dishware, bottle washers, bottle chillers, warmers, third sink washers, processing equipment such as tanks, vats, lines, pumps and hoses (e.g., dairy processing equipment for processing milk, cheese, ice cream and other dairy products), and transportation vehicles. The corrosion control composition or cationic alkyl polyglycosides can be used to inhibit corrosion in tanks, lines, pumps, and other equipment used for the manufacture and storage of soft drink materials, and also used in the bottling or containers for the beverages.

The corrosion control composition or cationic alkyl polyglycosides can also be used on or in other industrial equipment and in other industrial process streams such as heaters, cooling towers, boilers, retort waters, rinse waters, aseptic packaging wash waters, and the like. The corrosion control composition or cationic alkyl polyglycosides can be used to treat surfaces in recreational waters such as in pools, spas, recreational flumes and water slides, fountains, and the like.

The corrosion control composition or cationic alkyl polyglycosides can be used to treat surfaces contacted with cleaners in surfaces found in janitorial and/or housekeeping applications, food processing equipment and/or plant applications, and in laundry applications. For example, washers, such as tunnel washers for washing textiles, can be treated according to methods disclosed herein.

The corrosion control composition or cationic alkyl polyglycosides can be used or applied in combination with low temperature dish and/or warewash sanitizing final rinse, toilet bowl cleaners, and laundry bleaches. The corrosion control composition or cationic alkyl polyglycosides can be used to treat metal surfaces, such as ware, cleaned and/or sanitized with corrosive sources.

The corrosion control composition or cationic alkyl polyglycosides can be dispensed in any suitable method generally known by one skilled in the art. For example, a spray-type dispenser can be used. A spray-type dispenser functions by impinging a water spray upon an exposed surface of a composition to dissolve a portion of the composition, and then immediately directing the concentrate solution including the composition out of the dispenser to a storage reservoir or directly to a point of use.

The corrosion control composition or cationic alkyl polyglycosides can be dispensed by immersing either intermittently or continuously in the water, fluid, or gas of the water system. The corrosion control composition or cationic alkyl polyglycosides can then dissolve, for example, at a controlled or predetermined rate. The rate can be effective to maintain a concentration of the dissolved compounds or compositions that are effective for use according to the methods disclosed herein.

The corrosion control composition disclosed herein can comprise from about 10 to about 90 wt-% of the carrier, biocide, corrosion inhibitor, additional corrosion control composition agent, a combination thereof and from about 10 wt-% to about 90 wt-% of one or more cationic alkyl polyglycosides; from about 20 wt-% to about 80 wt-% of the carrier, biocide, corrosion inhibitor, additional corrosion control composition agent, a combination thereof and from about 10 wt-% to about 80 wt-% of one or more cationic alkyl polyglycosides, from about 30 wt-% to about 70 wt-% of the carrier, biocide, corrosion inhibitor, additional corrosion control composition agent, or a combination thereof and from about 30 wt-% to about 70 wt-% of one or more cationic alkyl polyglycosides, or from about 40 wt-% to about 60 wt-% of the carrier, biocide, corrosion inhibitor, additional corrosion control composition agent, or a combination thereof and from about 70 wt-% to about 84 wt. % of one or more cationic alkyl polyglycosides.

In one aspect, disclosed herein is a corrosion control composition for a water system, wherein the corrosion control composition comprises a cationic alkyl polyglycoside and one or more additional corrosion control composition agents, wherein the corrosion control composition reduces or mitigates corrosion on a metal surface in the water system.

In another aspect, disclosed herein is a method of corrosion control on a metal surface in a water system, wherein the method comprises providing a corrosion control composition into a water system to generate a treated water system or onto a surface in a water system, wherein the corrosion control composition comprises a cationic alkyl polyglycoside and wherein the corrosion control composition reduces or mitigates corrosion on the metal surface in the water system.

In some embodiments, the corrosion control composition can reduce or mitigate corrosion on a metal surface to about 280 mpy, about 265, about 250 mpy, about 225 mpy, about 200 mpy, about 175 mpy, about 150 mpy, about 175 mpy, about 100 mpy, or any value there between, when the cationic alkyl polyglycoside compound is at about 4 ppm and corrosion rate is measured by a bubble cell test.

In some embodiments, the corrosion control composition further comprises one or more additional corrosion control composition agents.

In some embodiments, the cationic alkyl polyglycoside is a cationic alkyl polyglucoside.

In some embodiments, the cationic alkyl polyglycoside comprises one or more glucose units and at least one cationic alkyl group R—Y, wherein R is an alkyl group and Y is a cationic group. In some other embodiments, the cationic alkyl polyglycoside is one of wherein R is an alkyl group; R is attached to at least one, more than one, or all of the OH groups; and at least one R group contains a cationic group Y.

In some embodiments, the cationic alkyl polyglycoside comprises two or more glucose units and the glucose units are connected by glycosidic bond. In some other embodiments, the cationic alkyl polyglycoside comprises two or more glucose units and the glucose units are connected by a non-glycosidic bond. In yet some other embodiments, the cationic alkyl polyglycoside comprises two or more glucose units and the glucose units are connected through a linker. In some other embodiments, the cationic alkyl polyglycoside comprises three or more glucose units and the glucose units are connected through a linker, glycosidic bond, non-glycosidic bond, or combination thereof.

In some embodiments, R is a $C_1$-$C_{30}$ alkyl. In some other embodiments, R is $C_8$-$C_{24}$ alkyl.

In some embodiments, the cationic group Y is $—NR^4R^5R^{6(+)}$, and $R^4$, $R^5$, and $R^6$ are independently $CH_3$. In some other embodiments, the cationic group Y is $—NR^4R^5R^{6(+)}$, $R^4$ and $R^5$ are independently $CH_3$, and $R^6$ is a $C_2$-$C_{12}$ aromatic alkyl. In yet some other embodiments, the cationic group Y is $—NR^4R^5R^{6(+)}$, $R^4$ and $R^5$ are independently $CH_3$, and $R^6$ is $—CH_2—C_6H_6$.

In some embodiments, the cationic group Y is $—NR^4R^5R^{6(+)}$ and the counter ion for the cationic group Y is chloride, bromide, fluoride, iodide, acetate, aluminate, cyanate, cyanide, dihydrogen phosphate, dihydrogen phosphite, formate, hydrogen carbonate, hydrogen oxalate, hydrogen sulfate, hydroxide, nitrate, nitrite, thiocyanate, or a combination thereof.

In some embodiments, the cationic alkyl polyglycoside comprises one cationic alkyl group R—Y. In some other embodiments, wherein the cationic alkyl polyglycoside comprises two same or different cationic alkyl groups R—Y. In yet some other embodiments, the cationic alkyl polyglycoside comprises three or more same or different cationic alkyl groups R—Y.

In some embodiments, the cationic alkyl polyglycoside further comprises one or more nonionic same or different alkyl groups $R^3$. In some other embodiments, $R^3$ is an unsubstituted, linear, and saturated $C_1$-$C_{20}$ alkylene group. In yet some other embodiments, $R^3$ is an unsubstituted, linear, and unsaturated $C_1$-$C_{20}$ alkylene group. In some other embodiments, $R^3$ is a linear $C_8$-$C_{18}$ alkyl, alkenyl, or alkynyl group. In some other embodiments, $R^3$ is a branched $C_8$-$C_{20}$ alkyl, alkenyl, or alkynyl group.

In some embodiments, the cationic alkyl polyglycoside is a single compound. In some other embodiments, the cationic alkyl polyglycoside is a mixture of two or more different alkyl polyglycosides, wherein the two or more different alkyl polyglycosides differ from each other by molecular weight, structure, net charge, or combination thereof.

In some embodiments, the cationic alkyl polyglycoside has an average molecular weight of from about 200 to about 5,500 Da.

In some embodiments, the cationic alkyl polyglycoside is

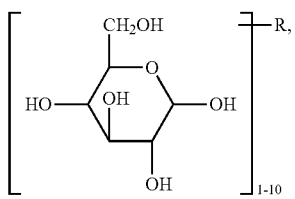

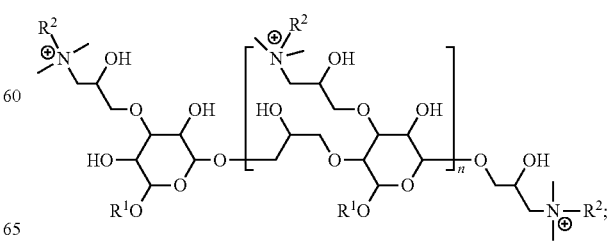

wherein n is 0-10, $R^1$ is a $C_1$-$C_{30}$ alkyl, and $R^2$ is a $C_1$-$C_{30}$ alkyl. In some embodiments, n is 0. In some other embodiments, n is 1. In yet some other embodiments, n is 2. In some other embodiments, n is 3, 4, 5, 6, 7, 8, 9, or 10. In some embodiments, the cationic alkyl polyglycoside is a mixture of the polyglucosides as shown above with different n values.

In some embodiments, $R^1$ is a $C_6$-$C_{20}$ alkyl. In some other embodiments, $R^1$ is a $C_8$-$C_{18}$ alkyl. In yet some other embodiments, $R^2$ is a $C_6$-$C_{20}$ alkyl. In some other embodiments, $R^2$ is a $C_8$-$C_{18}$ alkyl.

In some embodiments, $R^2$ and $R^1$ are $C_8$-$C_{18}$ alkyls.

In some embodiments, the alkyl polyglycoside is soluble or dispersible in water or the corrosion control composition.

In some embodiments, the corrosion control composition comprises a carrier, wherein the carrier is water, an organic solvent, or a mixture thereof.

In some embodiments, the corrosion control composition further comprises an organic solvent. In some other embodiments, the corrosion control composition further comprises an organic solvent and water.

In some embodiments, the organic solvent is an alcohol, a hydrocarbon, a ketone, an ether, an alkylene glycol, a glycol ether, an amide, a nitrile, a sulfoxide, an ester, or any combination thereof. In some other embodiments, the organic solvent is an alcohol, an alkylene glycol, an alkyleneglycol alkyl ether, or a combination thereof. In yet some embodiments, the organic solvent is methanol, ethanol, propanol, isopropanol, butanol, isobutanol, monoethyleneglycol, ethyleneglycol monobutyl ether, or a combination thereof.

In some embodiments, the organic solvent is methanol, ethanol, propanol, isopropanol, butanol, 2-ethylhexanol, hexanol, octanol, decanol, 2-butoxyethanol, methylene glycol, ethylene glycol, 1,2-propylene glycol, 1,3-propylene glycol, diethyleneglycol monomethyl ether, diethylene glycol monoethyl ether, ethylene glycol monobutyl ether, ethylene glycol dibutyl ether, pentane, hexane, cyclohexane, methylcyclohexane, heptane, decane, dodecane, diesel, toluene, xylene, heavy aromatic naphtha, cyclohexanone, diisobutylketone, diethyl ether, propylene carbonate, N-methylpyrrolidinone, N,N-dimethylformamide, a mixture thereof with water, or any combination thereof.

In some embodiments, wherein the corrosion control composition further comprises one or more of corrosion inhibitors. In some embodiments, wherein the corrosion control composition further comprises one or more of corrosion inhibitors and a carrier. In some embodiments, the corrosion inhibitor is an imidazoline compound, a pyridinium compound, or a combination thereof.

In some embodiments, the corrosion control composition further comprises an additional corrosion control composition agent. In some embodiments, the additional corrosion control composition agent is a single quaternary compound.

In some embodiments, the corrosion control composition further comprises a biocide. In some embodiments, the corrosion control composition further comprises a biocide and carrier. In some other embodiments, the corrosion control composition further comprises a biocide, corrosion inhibitor, and carrier.

In some other embodiments, the biocide is chlorine, hypochlorite, $ClO_2$, bromine, ozone, hydrogen peroxide, peracetic acid, peroxycarboxylic acid, peroxycarboxylic acid composition, peroxysulphate, glutaraldehyde, dibromonitrilopropionamide, isothiazolone, terbutylazine, polymeric biguanide, methylene bisthiocyanate, tetrakis hydroxymethyl phosphonium sulphate, and any combination thereof.

In some embodiments, the corrosion control composition further comprises an organic sulfur compound. In some other embodiments, wherein the organic sulfur compound is a mercaptoalkyl alcohol, mercaptoacetic acid, thioglycolic acid, 3,3'-dithiodipropionic acid, sodium thiosulfate, thiourea, L-cysteine, tert-butyl mercaptan, sodium thiosulfate, ammonium thiosulfate, sodium thiocyanate, ammonium thiocyanate, sodium metabisulfite, or a combination thereof.

In some embodiments, the corrosion control composition further comprises an acid. In some embodiments, the corrosion control composition further comprises an inorganic acid, mineral acid, organic acid, or mixture thereof. In some embodiments, the corrosion control composition comprises from about 1 wt-% to about 20 wt-% of the acid.

In some embodiments, the acid is hydrochloric acid, hydrofluoric acid, citric acid, formic acid, acetic acid, or mixture thereof.

In some embodiments, the corrosion control composition further comprises a hydrogen sulfide scavenger. In some other embodiments, the hydrogen sulfide scavenger is an oxidant, inorganic peroxide, sodium peroxide, chlorine dioxide; a $C_1$-$C_{10}$ aldehyde, formaldehyde, glyoxal, glutaraldehyde, acrolein, or methacrolein, a triazine, monoethanolamine triazine, monomethylamine triazine, or a mixture thereof.

In some embodiments, the corrosion control composition further comprises a surfactant. In some embodiments, the corrosion control composition further comprises a surfactant, biocide, and carrier.

In some embodiments, the surfactant is a nonionic, cationic, anionic, amphoteric, zwitterionic, Gemini, di-cationic, di-anionic surfactant, or mixtures thereof.

In some embodiments, the surfactant is an alkyl phenol, fatty acid, or mixture thereof.

In some embodiments, the corrosion control composition further comprises an asphaltene inhibitor, a paraffin inhibitor, a scale inhibitor, a gas hydrate inhibitor, a pH modifier, or any combination thereof.

In some embodiments, the corrosion control composition further comprises an emulsion breaker, reverse emulsion breaker, coagulant/flocculant agent, an emulsifier, a water clarifier, a dispersant, antioxidant, polymer degradation prevention agent, permeability modifier, foaming agent, antifoaming agent, emulsifying agent, scavenger agent for $CO_2$, and/or 02, gelling agent, lubricant, friction reducing agent, salt, or mixture thereof.

In some embodiments, the corrosion control composition further comprises a surfactant. In some other embodiments, the corrosion control composition further comprises a foaming surfactant. In yet some other embodiments, the corrosion control composition further comprises a defoaming surfactant or agent.

In some embodiments, the corrosion control composition further comprises a preservative. In some other embodiments, the corrosion control composition further comprises a non-oxidizing biocide, surfactant, biocide, and preservative. In yet some other embodiments, the corrosion control composition further comprises a non-oxidizing biocide, surfactant, biocide, preservative and water clarifier. In some other embodiments, the corrosion control composition further comprises a surfactant, biocide, preservative, and water clarifier.

In some embodiments, the corrosion control composition is a liquid, gel, or a mixture comprising liquid/gel and solid.

In some embodiments, the corrosion control composition or a use solution thereof has a pH of from about 2 to about 11.

In some embodiments, the corrosion control composition comprises from about 20 wt-% to about 60 wt-% of the alkyl glucoside or a mixture thereof.

In some embodiments, the alkyl polyglucoside or mixture thereof has a concentration of from about 1 ppm to about 1000 ppm in the treated water system.

In some embodiments, the corrosion control composition is provided to the water system independently, simultaneously, or sequentially with an additional functional ingredient.

In some embodiments, the water system comprises fresh water, recycled water, salt water, surface water, produced water, or mixture thereof. In some embodiments, the water system is a cooling water system, boiler water system, petroleum wells, downhole formations, geothermal wells, mineral washing, flotation and benefaction, papermaking, gas scrubbers, air washers, continuous casting processes in the metallurgical industry, air conditioning and refrigeration, water reclamation, water purification, membrane filtration, food processing, clarifiers, municipal sewage treatment, municipal water treatment, or potable water system.

In some embodiments, the water system is a surface that can be exposed to any water moisture.

In some embodiments, the corrosion control composition or one or more cationic alkyl polyglycosides disclosed herein can mitigate, reduce, or control corrosion on a surface in a water system as indicated by the bubble cell test described in the Examples section of this disclosure, when the water system has a cationic alkyl polyglycoside, or mixture thereof concentration of from about 1 ppm to about 1,000 ppm, from about 1 to about 900 ppm, from about 1 ppm to about 800 ppm, from about 1 ppm to about 700 ppm, from about 1 ppm to about 600 ppm, from about 1 ppm to about 500 ppm, from about 1 ppm to about 400 ppm, from about 1 ppm to about 300 ppm, from about 1 ppm to about 250 ppm, from about 1 ppm to about 200 ppm, from about 1 ppm to about 150 ppm, from about 1 ppm to about 100 ppm, from about 1 ppm to about 50 ppm, from about 1 ppm to about 25 ppm, from about 1 ppm to about 10 ppm, from about 0.5 ppm to about 2 ppm, about 950 ppm, about 850 ppm, about 750 ppm, about 650 ppm, about 550 ppm, about 450 ppm, about 350, about 250 ppm, about 150 ppm, 50 ppm, about 25 ppm, about 10 ppm, about 5 ppm, about 2 ppm, about 1 ppm, about 0.5 ppm or any value there between, after dosing the water system with the cationic alkyl polyglycoside, or mixture thereof, or the corrosion control composition disclosed herein.

As used herein, the term "substantially free", "free" or "free of" refers to compositions completely lacking the component or having such a small amount of the component that the component does not affect the performance of the composition. The component may be present as an impurity or as a contaminant and shall be less than 0.5 wt-%. In another embodiment, the amount of the component is less than 0.1 wt-% and in yet another embodiment, the amount of component is less than 0.01 wt-%.

The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

The methods and compositions of the present disclosure may comprise, consist essentially of, or consist of the components and ingredients of the disclosed compositions or methods as well as other ingredients described herein. As used herein, "consisting essentially of" means that the methods and compositions may include additional steps, components or ingredients, but only if the additional steps, components or ingredients do not materially alter the basic and novel characteristics of the claimed methods and compositions.

EXAMPLES

Embodiments of the present disclosure are further defined in the following non-limiting Examples. These Examples, while indicating certain embodiments of the disclosure, are given by way of illustration only. From the above discussion and these Examples, one skilled in the art can ascertain the essential characteristics of this disclosure, and without departing from the spirit and scope thereof, can make various changes and modifications of the embodiments of the disclosure to adapt it to various usages and conditions. Thus, various modifications of the embodiments of the disclosure, in addition to those shown and described herein, will be apparent to those skilled in the art from the foregoing description. Such modifications are also intended to fall within the scope of the appended claims.

Example 1

Effect of Some Cationic Alkyl Polyglucoside Compounds for Corrosion Control

Some exemplary cationic alkyl polyglucoside (APG) compounds were tested for their efficacy to reduce corrosion or for corrosion control in a water system. The structures of the compounds tested in this example have a general structure as shown below. The specific $R^1$ and $R^2$ groups for each tested compound are listed in Table 3.

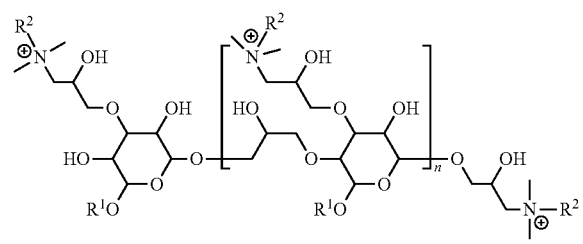

TABLE 3

Cationic Alkyl Polyglucoside Compounds Tested for Corrosion Control

| ID | Structure or Name | R1 Group | R2 Group |
|---|---|---|---|
| 1 | Poly Suga ® Quat L-1210P | C12 | C12 |
| 2 | Poly Suga ® Quat S-1210P | C18 | C12 |

The control chemistry used for comparison was an imidazoline made from the reaction of tall oil fatty acid (TOFA) with diethylene triamine (DETA) and further salted with acetic acid. This chemistry is known to be often used as oilfield corrosion inhibitors.

The efficacy for corrosion control is often measured by corrosion bubble cell tests. The bubble cell test simulates low flow areas where little or no mixing of water and oil occurs. The test was conducted using brine (80% of the brine having 3% sodium chloride and 20% of the brine being a hydrocarbon containing 100% LVT-200 kerosene oil). The brine was placed into kettles and purged with carbon dioxide. The brine was continually purged with carbon dioxide to saturate the brine prior to starting the test. After the test began, the test cell was blanketed with carbon dioxide one hour prior to electrode insertion and through the duration of the test to maintain saturation. The kettles were stirred at 150 revolutions per minute (rpm) for the duration of the test to maintain thermal equilibrium at 80° C. The corrosion rate was measured by Linear Polarization Resistance (LPR) techniques. The working electrode used was carbon steel. The counter and reference electrodes were both Hastelloy. The electrodes were all cleaned and polished prior to testing.

Data were collected for three hours before about 4 ppm of each of the tested and control compositions was dosed into its respective cell. Each tested or control composition comprises 10 wt-% of the tested or control compound and 1 wt-% of 2-mercaptoethanol (2ME) as synergist in an organic solvent. The actual concentration of the tested or control compound in each cell was 4 ppm and one of 2ME was 0.4 ppm. Data were collected overnight.

The results of the bubble cell test are shown in FIG. 1 and Table 4, wherein ppm is parts per million, CI is corrosion inhibitor, and mpy is mils per year. 0.4 ppm of 2-mercaptoethanol (2ME) were present with each cationic alkyl polyglucoside (APG) compound or control. FIG. 1 shows the corrosion rate in mils per year during the bubble test period (18 hour). For the blank sample, no 2-mercaptoethanol (2ME) was added.

TABLE 4

Corrosion rate at 15th Hour after APG or control compound in bubble test results

| APG or Control Cationic Compound | Dosage of APG or Compound (ppm) | Inhibited Corrosion Rate 15 h After APG or Control Addition (mpy) | % Protection |
|---|---|---|---|
| Blank | 0 | 500 | N/A |
| TOFA: DETA imidazoline salted with acetic acid (Control) | 4 | 107 | 79 |
| 1 | 4 | 41 | 92 |
| 2 | 4 | 60 | 88 |

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

The disclosure being thus described, it will be obvious that the same may be varied in many ways. Such variations are not to be regarded as a departure from the spirit and scope of the disclosure and all such modifications are intended to be included within the scope of the following claims.

What is claimed is:

1. A method of controlling corrosion on a surface in a water system comprising:

providing a corrosion control composition or a use solution of the corrosion control composition into a water system to generate a treated water system or onto a metal surface of the water system, wherein the corrosion control composition comprises a cationic alkyl polyglycoside, wherein the cationic alkyl polyglycoside is a cationic alkyl polyglucoside comprising one or more glucose units and at least two cationic alkyl groups R-Y, wherein R is an alkyl group and Y is a cationic group; and wherein the corrosion control composition reduces corrosion on the metal surface in the water system.

2. The method according to claim 1, wherein the cationic alkyl polyglucoside comprises two or more glucose units they are connected by a glycosidic bond, a non-glycosidic bond, a linker or a combination thereof.

3. The method according to claim 1, wherein the cationic alkyl polyglucoside is one of

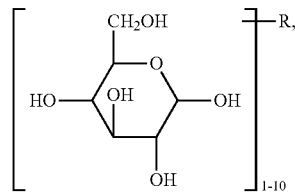

wherein the cationic alkyl polyglucoside comprises the at least two cationic alkyl groups R-Y.

4. The method according to claim 1, wherein R is a $C_1$-$C_{30}$ alkyl or $C_8$-$C_{24}$ alkyl, and wherein Y is —$NR^4R^5R^{6(+)}$, and $R^4$, $R^5$, and $R^6$ are independently $CH_3$, Y is —$NR^4R^5R^{6(+)}$, $R^4$ and $R^5$ are independently $CH_3$, and $R^6$ is a $C_2$-$C_{12}$ aromatic alkyl, Y is —$NR^4R^5R^{6(+)}$, $R^4$ and $R^5$ are independently $CH_3$, and $R^6$ is —$CH_2$—$C_6H_6$ or Y is —$NR^4R^5R^{6(+)}$ and the counter ion for the cationic group Y is chloride, bromide, fluoride, iodide, acetate, aluminate, cyanate, cyanide, dihydrogen phosphate, dihydrogen phosphite, formate, hydrogen carbonate, hydrogen oxalate, hydrogen sulfate, hydroxide, nitrate, nitrite, thiocyanate, or a combination thereof.

5. The method according to claim 1, wherein the cationic alkyl polyglucoside comprises at least three cationic alkyl group R—Y.

6. The method according to claim 1, wherein the cationic alkyl polyglucoside further comprises one or more nonionic alkyl groups $R^3$.

7. The method according to claim 6, wherein $R^3$ is an unsubstituted, linear, and saturated $C_1$-$C_{20}$ alkylene group, $R^3$ is a linear $C_8$-$C_{18}$ alkyl, alkenyl, or alkynyl group, or $R^3$ is a branched $C_8$-$C_{20}$ alkyl, alkenyl, or alkynyl group.

8. The method according to claim 1, wherein the cationic alkyl polyglucoside is a single compound, or a mixture of two or more different alkyl polyglucosides, wherein the two or more different alkyl polyglucosides differ from each other by molecular weight, structure, net charge, or combination thereof, and wherein the cationic alkyl polyglucoside has an average molecular weight of from about 200 to about 5,500 Da.

9. The method according to claim 1, wherein the cationic alkyl polyglucoside is

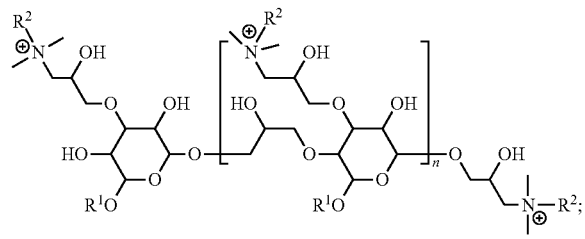

wherein n is 0-10, $R^1$ is a $C_1$-$C_{30}$ alkyl, and $R^2$ is a $C_1$-$C_{30}$ alkyl.

10. The method according to claim 1, wherein the cationic alkyl polyglucoside is soluble or dispersible in water or the corrosion control composition, and wherein the corrosion control composition further comprises one or more additional corrosion control composition agents comprising a carrier, wherein the carrier is water, an organic solvent, wherein the organic solvent is an alcohol, a hydrocarbon, a ketone, an ether, an alkylene glycol, a glycol ether, an amide, a nitrile, a sulfoxide, an ester, or any combination thereof, or a mixture thereof.

11. The method according to claim 10, the organic solvent is an alcohol, an alkylene glycol, an alkyleneglycol alkyl ether, or a combination thereof.

12. The method according to claim 1, wherein the corrosion control composition further comprises one or more of additional corrosion inhibitors comprising an imidazoline compound, a pyridinium compound, or a combination thereof, and/or a fouling control agent.

13. The method according to claim 1, wherein the corrosion control composition further comprises a biocide, wherein the biocide is chlorine, hypochlorite, $ClO_2$, bromine, ozone, hydrogen peroxide, peracetic acid, peroxycarboxylic acid, peroxycarboxylic acid composition, peroxysulphate, glutaraldehyde, dibromonitrilopropionamide, isothiazolone, terbutylazine, polymeric biguanide, methylene bisthiocyanate, tetrakis hydroxymethyl phosphonium sulphate, and any combination thereof, and/or a preservative.

14. The method according to claim 1, wherein the corrosion control composition further comprises an acid and wherein the corrosion control composition comprises from about 1 wt-% to about 20 wt-% of the acid, and wherein the acid is hydrochloric acid, hydrofluoric acid, citric acid, formic acid, acetic acid, or mixture thereof.

15. The method according to claim 1, wherein the corrosion control composition further comprises a hydrogen sulfide scavenger, and wherein the hydrogen sulfide scavenger is an oxidant, inorganic peroxide, sodium peroxide, chlorine dioxide; a $C_1$-$C_{10}$ aldehyde, formaldehyde, glyoxal, glutaraldehyde, acrolein, or methacrolein, a triazine, monoethanolamine triazine, monomethylamine triazine, or a mixture thereof.

16. The method according to claim 1, wherein the corrosion control composition further comprises a surfactant, and wherein the surfactant is a nonionic, semi-nonionic, cationic, anionic, amphoteric, zwitterionic, Gemini, di-cationic, di-anionic surfactant, or mixtures thereof.

17. The method according to claim 16, wherein the surfactant is an alkyl phenol, fatty acid, or mixture thereof.

18. The method according to claim 1, wherein the corrosion control composition further comprises an asphaltene inhibitor, a paraffin inhibitor, a scale inhibitor, a gas hydrate inhibitor, a pH modifier, an emulsion breaker, reverse emulsion breaker, coagulant/flocculant agent, an emulsifier, a water clarifier, a dispersant, antioxidant, polymer degradation prevention agent, permeability modifier, foaming agent, antifoaming agent, emulsifying agent, scavenger agent for $CO_2$, and/or $O_2$, gelling agent, lubricant, friction reducing agent, salt, or any combination thereof.

19. The method according to claim 1, wherein the corrosion control composition is a liquid, gel, or a mixture comprising liquid/gel and solid, and wherein the corrosion control composition or a use solution thereof has a pH of from about 2 to about 11.

20. The method according to claim 1, wherein the corrosion control composition comprises from about 20 wt-% to about 60 wt-% of the cationic alkyl polyglycoside or mixture thereof, wherein the cationic alkyl polyglycoside or mixture thereof has a concentration of from about 1 ppm to about 1000 ppm in the treated water system, and wherein the cationic alkyl polyglycoside or mixture thereof is provided to the water system independently, simultaneously, or sequentially with one or more of the corrosion control composition agents.

21. The method according to claim 1, wherein the water system comprises fresh water, recycled water, salt water, surface water, produced water, or mixture thereof, and wherein the water system is a cooling water system, boiler water system, petroleum wells, downhole formations, geothermal wells, mineral washing, flotation and benefaction, papermaking, gas scrubbers, air washers, continuous casting processes in the metallurgical industry, air conditioning and refrigeration, water reclamation, water purification, membrane filtration, food processing, clarifiers, municipal sewage treatment, municipal water treatment, or potable water system.

22. The method according to claim 1, wherein the water system is a surface that can be exposed to any water moisture.

* * * * *

UNITED STATES PATENT AND TRADEMARK OFFICE
CERTIFICATE OF CORRECTION

Page 1 of 1

PATENT NO. : 11,155,480 B2
APPLICATION NO. : 16/774226
DATED : October 26, 2021
INVENTOR(S) : Jeremy Moloney, Ashish Dhawan and Carter M. Silvernail It is certified that error appears in the above-identified patent and that said Letters Patent is hereby corrected as shown below:

On the Title Page

Item (56) (Other Publications) in Column 2, Line 4:
DELETE: "Declataion"
INSERT: --Declaration--

In the Claims

In Claim 2, Column 56, at approximately Line 17:
DELETE: "they are"

In Claim 5, Column 56, at approximately Line 49:
DELETE: "group"
INSERT: --groups--

In Claim 11, Column 57, at approximately Line 27:
DELETE: "the"
INSERT: --wherein the--

Signed and Sealed this
Twelfth Day of April, 2022

Drew Hirshfeld
*Performing the Functions and Duties of the
Under Secretary of Commerce for Intellectual Property and
Director of the United States Patent and Trademark Office*